(12) United States Patent
May et al.

(10) Patent No.: US 10,298,480 B2
(45) Date of Patent: May 21, 2019

(54) NETWORK COMMUNICATION METHODS AND APPARATUS

(71) Applicant: Ribbon Communications Operating Company, Inc., Westford, MA (US)

(72) Inventors: Karl May, Menlo Park, CA (US); Alan McKee, Templepatrick (GB); Trevor Graham, Hillsborough (GB); Richard King, San Jose, CA (US); Scott Walker, Hillsborough (GB); Piotr Myslinski, Fremont, CA (US)

(73) Assignee: Ribbon Communications Operating Company, Inc., Westford, MA (US)

( * ) Notice: Subject to any disclaimer, the term of this patent is extended or adjusted under 35 U.S.C. 154(b) by 171 days.

(21) Appl. No.: 14/592,179

(22) Filed: Jan. 8, 2015

(65) Prior Publication Data
US 2015/0124583 A1 May 7, 2015

Related U.S. Application Data

(63) Continuation of application No. 14/143,726, filed on Dec. 30, 2013, now abandoned, which is a
(Continued)

(51) Int. Cl.
*H04K 1/00* (2006.01)
*H04K 1/10* (2006.01)
(Continued)

(52) U.S. Cl.
CPC .......... *H04L 43/14* (2013.01); *H04J 14/0227* (2013.01); *H04J 14/0298* (2013.01);
(Continued)

(58) Field of Classification Search
CPC ..... H04L 43/14; H04L 43/04; H04L 41/0816; H04J 14/0227; H04J 14/0298; H04K 1/003
(Continued)

(56) References Cited

U.S. PATENT DOCUMENTS 6,411,946 B1 * 6/2002 Chaudhuri ........... G06Q 20/102
705/40
6,639,910 B1 * 10/2003 Provencher ............... G06F 1/14
370/254
(Continued)

FOREIGN PATENT DOCUMENTS

JP     2004260671 A     9/2004

OTHER PUBLICATIONS

International Search Report from International Application No. PCT/US2014/072807, pp. 1-3, dated May 4, 2015.
(Continued)

*Primary Examiner* — David R Lazaro
*Assistant Examiner* — Zi Ye
(74) *Attorney, Agent, or Firm* — Straub & Straub; Stephen T. Straub; Michael P. Straub

(57) ABSTRACT

The present invention includes various novel systems and methods for communication in a network. A System Environment Monitor is employed in some embodiments to extract from the network both real-time and historical Network Metrics at the Infrastructure Layer, as well as Application Metadata at the Application Layer. Network analytics facilitate decisions based upon the differing characteristics of Application Components and lower-level hardware components across multiple DTTs. In response, an SDN Controller generates modified sets of SDN Flows, and implements them in real time across a mixed technology (multi-DTT) network in a manner that avoids disrupting existing SDN Flows and other real-time network traffic.

20 Claims, 9 Drawing Sheets

Related U.S. Application Data continuation-in-part of application No. 14/063,955, filed on Oct. 25, 2013, now abandoned, which is a continuation of application No. 13/031,594, filed on Feb. 21, 2011, now Pat. No. 8,705,741.

(60) Provisional application No. 61/306,925, filed on Feb. 22, 2010.

(51) Int. Cl.
  *H04J 14/02* (2006.01)
  *H04L 12/24* (2006.01)
  *H04L 12/26* (2006.01)
  *H04L 29/06* (2006.01)
  *H04L 29/08* (2006.01)
  *H04L 12/721* (2013.01)

(52) U.S. Cl.
  CPC .............. *H04K 1/003* (2013.01); *H04K 1/10* (2013.01); *H04L 41/0816* (2013.01); *H04L 41/0823* (2013.01); *H04L 41/12* (2013.01); *H04L 41/145* (2013.01); *H04L 43/0823* (2013.01); *H04L 45/14* (2013.01); *H04L 67/28* (2013.01); *H04L 63/08* (2013.01)

(58) Field of Classification Search
  USPC .................................................. 709/240, 224
  See application file for complete search history.

(56) References Cited

U.S. PATENT DOCUMENTS

| | | | |
|---|---|---|---|
| 7,627,671 B1 | 12/2009 | Palma et al. | |
| 7,774,440 B1* | 8/2010 | Bagrodia | H04L 41/0816 703/1 |
| 2002/0034187 A1* | 3/2002 | Kalkunte | H04L 49/3009 370/401 |
| 2003/0061353 A1 | 3/2003 | Johnson et al. | |
| 2004/0018016 A1* | 1/2004 | O'Mahony | H04Q 11/0005 398/43 |
| 2008/0219268 A1 | 9/2008 | Dennison | |
| 2009/0285124 A1 | 11/2009 | Aguiree et al. | |
| 2010/0146108 A1 | 6/2010 | Li et al. | |
| 2011/0261722 A1* | 10/2011 | Awano | H04L 45/34 370/254 |
| 2012/0079098 A1* | 3/2012 | Moehler | G06F 11/0775 709/224 |
| 2013/0163465 A1* | 6/2013 | Krishnaswamy | H04L 47/2425 370/254 |
| 2013/0250770 A1 | 9/2013 | Zou et al. | |
| 2014/0006510 A1* | 1/2014 | Hamilton | H04W 8/24 709/204 |
| 2014/0040442 A1* | 2/2014 | Saavedra | H04L 41/0816 709/221 |
| 2014/0269260 A1* | 9/2014 | Xue | H04L 41/12 370/225 |
| 2015/0052243 A1* | 2/2015 | Lumezanu | H04L 43/04 709/224 |

OTHER PUBLICATIONS

Written Opinion of the International Searching Authority from International Application No. PCT/US2014/072807, pp. 1-6, dated May 4, 2015.

Supplementary European Search Report Application No. EP 14876520.9, pp. 1-9, dated Aug. 23, 2017.

* cited by examiner

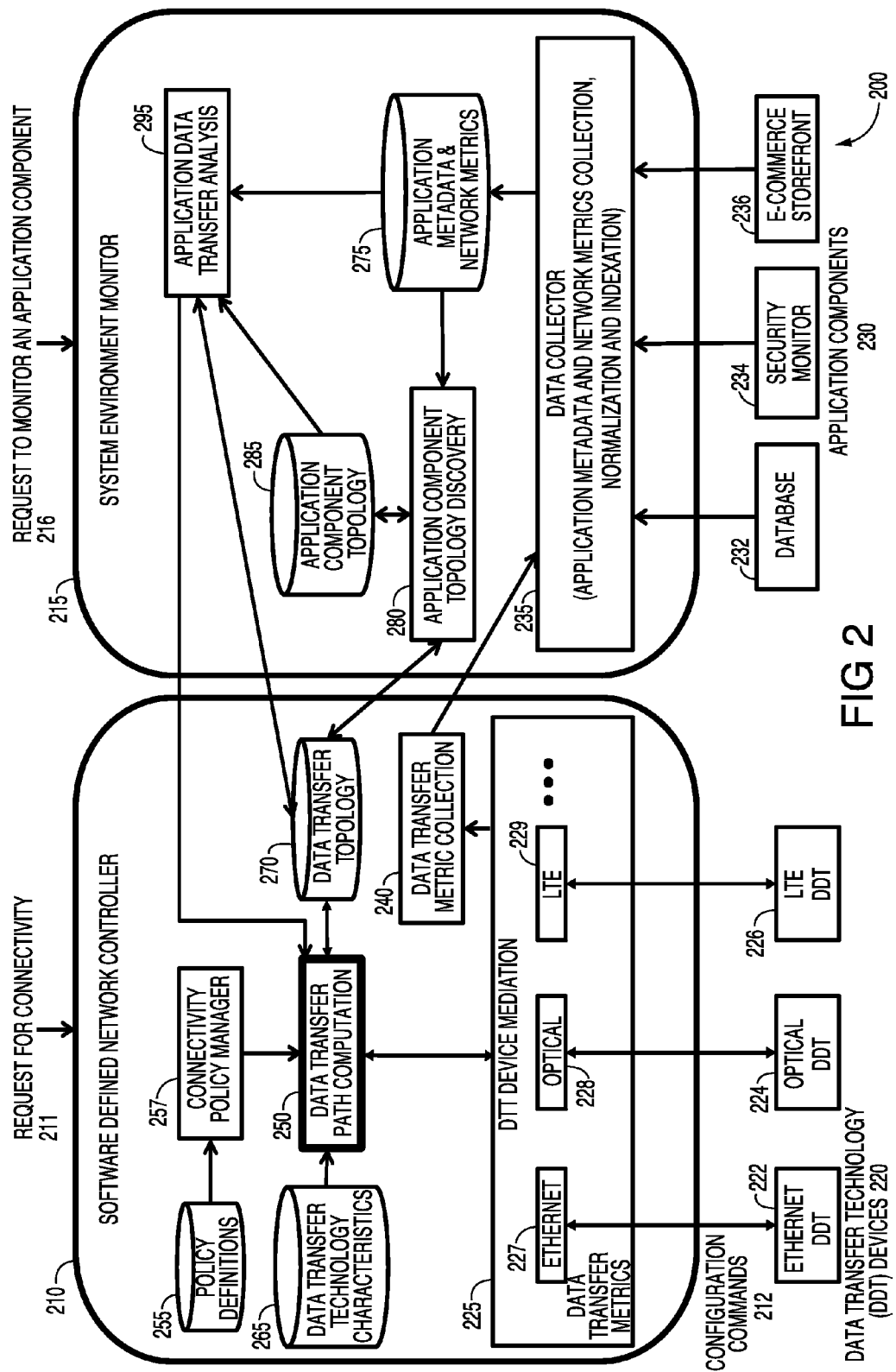

NETWORK COMMUNICATION METHODS AND APPARATUS

CROSS REFERENCE TO RELATED APPLICATIONS

The present application is a continuation of U.S. patent application Ser. No. 14/143,726 filed Dec. 30, 2013, entitled "SUBCHANNEL SECURITY AT THE OPTICAL LAYER" which is hereby incorporated by reference in its entirety and is also related to the following applications: U.S. patent application Ser. No. 14/063,955, filed Oct. 25, 2013, entitled "SUBCHANNEL SECURITY AT THE OPTICAL LAYER", U.S. patent application Ser. No. 13/031,594, filed Feb. 21, 2011, entitled "Subchannel Security at the Optical Layer", and U.S. Provisional Patent Application No. 61/306,925, filed Feb. 22, 2010, entitled "Subchannel Security at the Optical Layer", each of which is hereby incorporated by reference in its entirety.

FIELD

The present invention relates generally to network optimization, and more particularly to non-disruptive optimization of SDN Flows across different data transfer technologies based on real-time monitoring of application-level metadata and infrastructure-level network metrics.

BACKGROUND

Software-defined networking (SDN) has recently emerged as a new network paradigm which enables network administrators to manage network services by abstracting lower-level functionality. In essence, SDN decouples the layer of the routing architecture that determines the paths along which network traffic should be sent (Control Plane) from the layer that forwards network traffic along those paths to its desired destinations (Forwarding Plane—sometimes also referred to as the Data Plane, Transport Plane or Flow Plane). In doing so, distributed Control Plane logic can be physically removed from multiple routing and switching devices and implemented, for example, in software running on a centralized server.

The Control Plane maintains the "network map" (also referred to as the network topology or system topology), which defines network nodes (including physical network devices) and their interconnections. In addition, the Control Plane maintains the rules for "routing" network traffic among these network nodes.

This system topology encompasses not only physical connections among network nodes, but also manually configured static routes, status information from hardware devices and software-defined interfaces, as well as information derived from dynamic routing protocols. The Control Plane ultimately determines the "best" route for particular network traffic, optimizing for various desired goals, such as "quality of service" (QoS) or minimal network congestion.

The Forwarding Plane implements the routes established by the Control Plane—e.g., determining how to forward packets arriving at a router's inbound interface to its appropriate outbound interfaces. The Forwarding Plane implements lower-level functionality, such as extracting and analyzing information from packet headers and other fields, traversing and caching portions of large routing tables, and employing various search and memory management algorithms to efficiently route packets to their intended destinations.

In traditional network devices, the Control Plane and Forwarding Plane both exist within the same physical device (the Control Plane being distributed across many or all of the devices that make up the network). SDN physically separates the Control Plane from the Forwarding Plane, effectively requiring a more robust protocol for communication between the two Planes.

"OpenFlow" (from the Open Networking Foundation, or ONF) is one popular standard that has emerged to implement a communications interface between physically disparate Control Plane and Forwarding Plane layers of an SDN network architecture. While other communications protocols could be employed, OpenFlow has achieved such widespread acceptance that it is often used synonymously with SDN. The term, "SDN Flow" (or simply "traffic path") is typically used to represent a path or route that particular network traffic can traverse between its source and destination network devices.

By separating the Control Plane (implemented, for example, in software on a server, often referred to as an "SDN Controller") from the Forwarding Plane software and firmware embedded in physical switches and routers, an SDN network architecture facilitates virtualization not only of the lower-level hardware Infrastructure Layer, but also of the higher-level Application Layer. For example, an SDN Controller can communicate, via well-defined Application Programming Interfaces (APIs), with applications running on a network in order to optimize particular SDN Flows relevant to a particular application ("Application Optimization") or to the network as a whole ("System Optimization"). Moreover, "Predictive Optimization" of an application or entire network can be implemented over time, for example, based on historical performance over various time periods or during a particular time of day. Various other advantages of SDN network architectures can be found, for example, at http://www.opennetsummit.org/why-sdn.html.

As alluded to above, network nodes consist not only of individual hardware devices (e.g., routers, switches, servers, optical transponders, multiplexers, etc.) that communicate with one another at the Infrastructure Layer, but also of more abstract "Application Components" (e.g., web servers, storage arrays and databases, Corporate LANs, E-Commerce storefronts, etc.) that are utilized by software applications and communicate with one another at the Application Layer. An SDN Controller can generate optimized SDN Flows among Application Components at the Application Layer, which can then be translated into lower-level SDN Flows at the Infrastructure Layer (and implemented, for example, by the Forwarding Plane of various network devices interconnecting those Application Components).

Whether optimizing performance among low-level hardware devices at the Infrastructure Layer, or Application Components at the Application Layer, or even the overall system, SDN Controllers rely on data extracted from the network, often in real-time while individual applications are running.

For example, "Network Metrics" (number of hops between nodes, bandwidth, latency, packet loss, etc.) typically reflect the performance of low-level hardware devices, such as routers and switches, at the Infrastructure Layer.

"Application Metadata," on the other hand, provide more abstract performance data at the higher-level Application Layer. Application Metadata includes, for example, various performance metrics such as overall throughput, transaction rate, elapsed transaction times, thread counts, number of concurrent users, number of running instances, uptime or downtime metrics, database size or other storage metrics, memory/disk/CPU utilization rates, etc. It also includes errors, warnings and related events maintained in application log file entries, as well as monitoring metrics of message queues (e.g., messages per second, failures, etc.). Moreover, Application Metadata includes data generated by dedicated monitoring systems, including security monitors, firewalls (including deep packet inspectors), WAN accelerators, load balancers, etc.

At a more conceptual level, purchasing a popular DVD on "Black Friday" at Amazon, for example, may take longer than on other days due to an unusually high number of concurrent users. Data logs generated by Amazon's E-Commerce storefront software may reflect the congested nature of such "busy day" transactions.

By employing a "System Environment Monitor" to extract Network Metrics and Application Metadata in real time, an SDN Controller can detect such unusual conditions and other anomalies at the system level or within a particular application, and employ "network analytics" to address them specifically (e.g., by increasing bandwidth to relevant servers), or more generally by optimizing traffic flow among Application Components or the system as a whole to achieve a particular desired goal, such as minimizing network congestion, or providing a particular QoS (e.g., a maximum latency for a particular type of transaction), among other objectives. As a result of such optimizations, an SDN Controller typically generates a revised set of SDN Flows—i.e., a remapping of network traffic routes among network nodes, including Application Components (typically "endpoints" of an SDN Flow) and lower-level hardware devices such as routers and switches (typically intermediate nodes between the Application Components over which network traffic is routed).

Various companies have recognized the value of leveraging network analytics to optimize their SDN Controller solutions—in particular by modifying SDN Flows. See, for example, recent integrated solutions from Brocade and Boundary:

Brocade/IBM
      http://community.brocade.com/community/discuss/sdn/blog/2013/01/29/network-analytics-and-openflowsdn
   Boundary/Splunk
      http://boundary.com/blog/2013/04/26/boundary-adds-application-context-data-to-splunk-enterprise/
   Boundary/Plexxi
      http://boundary.com/product/boundary-product-integrations/boundary-software-defined-networking-sdn/

Others have characterized their approaches to this problem using the term "SON" for self-organizing networks or self-optimizing networks, or "AON" for applications-optimized networks (see, e.g., http://www.nojitter.com/nost/240153039/hp-and-microsoft-demo-openflowlync-applicationsoptimized-network).

These "solutions," however, fail to address certain significant realities of existing SDN networks. One such reality is the fact that implementing revised SDN Flows often disrupts existing SDN Flows (to be modified), as well as other real-time network traffic. Applications running on the network may, as a result of these attempted optimizations, experience downtime or errors that, in some cases, can be quite costly.

Another reality is the existence of "mixed" networks that encompass multiple different "Data Transfer Technologies" or DTTs. For example, many existing SDN networks include not only IP-based packet-switched devices (e.g., IP routers), but also optical circuit-switched devices (e.g., optical multiplexers and cross-connect switches). Other DTTs include wireless network devices, such as WiFi routers, cellular 3G, 4G and LTE routing devices, as well as various other types of routers, switches and other network devices. An SDN Controller with access to the entire system topology and application-to-application traffic paths (including the different characteristics of these various hardware components across multiple DTTs in a mixed network) is in a unique position to leverage this knowledge to better optimize SDN Flows—e.g., by generating one or more SDN Flows that traverse hardware components across multiple DTTs.

What is therefore needed is a system that can extract Network Metrics and Application Metadata in real time from a mixed technology (multi-DTT) network, and, in response, generate and implement modified SDN Flows in real time throughout the network in a non-disruptive manner.

SUMMARY

In accordance with the present invention, various embodiments of novel methods and architectures are disclosed to address these problems. A System Environment Monitor is employed to extract from the network both real-time and historical Network Metrics at the Infrastructure Layer, as well as Application Metadata at the Application Layer. Network analytics facilitate decisions based upon the differing characteristics of Application Components and lower-level hardware components across multiple DTTs. In response, an SDN Controller generates modified sets of SDN Flows, and implements them in real time across a mixed technology (multi-DTT) network in a manner that avoids disrupting existing SDN Flows and other real-time network traffic.

This real-time automated feedback loop facilitates optimizations of SDN Flows to minimize network congestion and achieve various desired QoS objectives that are relevant to particular applications (Application Optimization), as well as to the entire system (System Optimization). Predictive Optimization is also employed based on the historical performance of applications and lower-level network hardware over time, using simulation to determine whether proposed changes to a set of SDN Flows yields an overall improvement in network performance or efficiency.

BRIEF DESCRIPTION OF THE FIGURES

FIG. 2 is a block diagram illustrating embodiments of an SDN Controller and System Environment Monitor of the present invention;

DETAILED DESCRIPTION

In the detailed embodiments described below, it should be noted that the physical form in which architectural components, processes and other functionality is embodied can vary from dedicated computer hardware to software running on a general-purpose computer to a myriad of hybrid implementations allocating such functionality among different hardware and software components. It should be noted that even software components are typically embodied in physical non-transitory storage media (i.e., memory), such as hard disk drives, flash memory, etc.

Figure 1A:
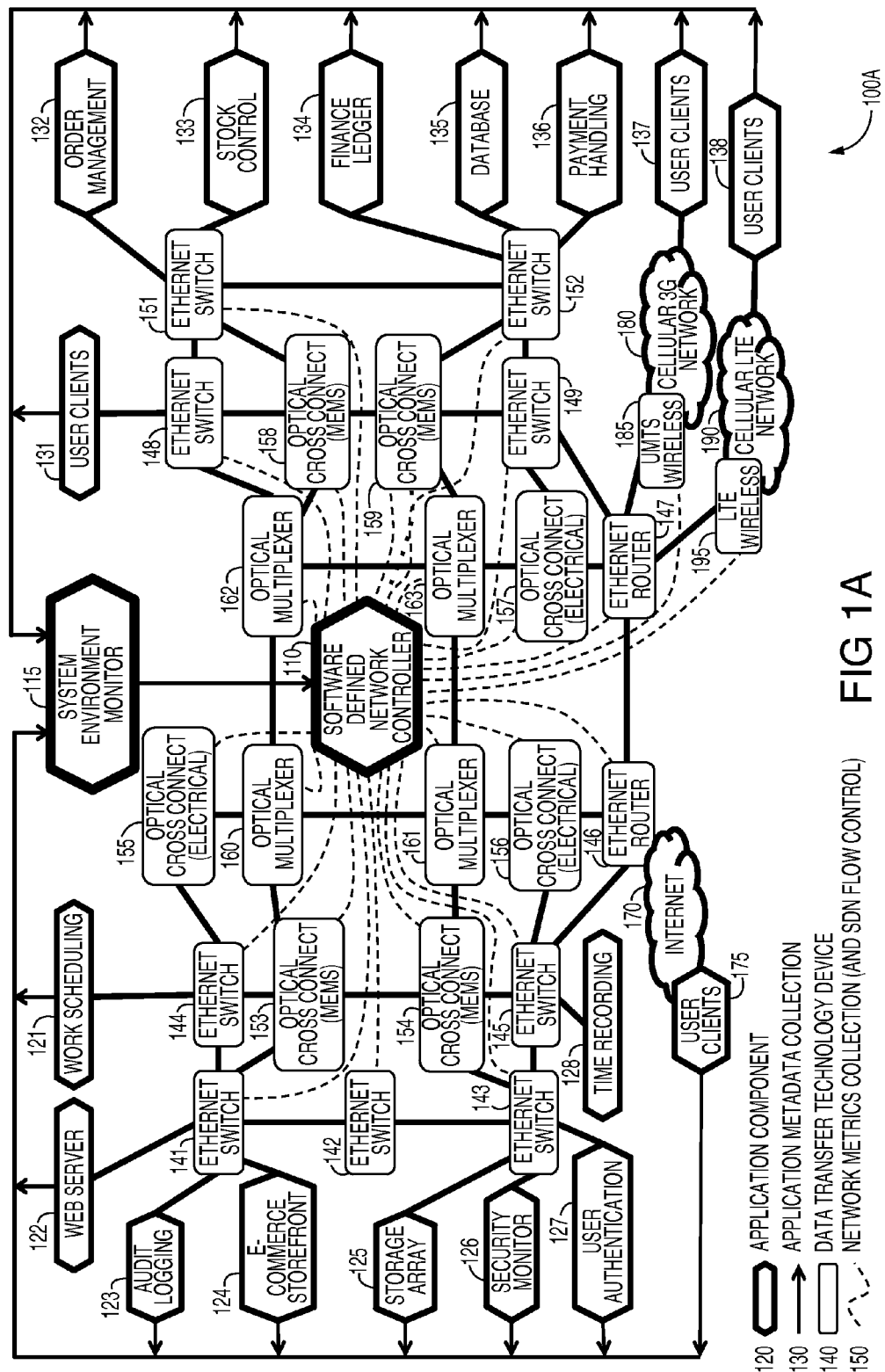
FIG. 1A is a block diagram illustrating an embodiment of an overall system architecture of the System Environment of the present invention, including various respective Data Transfer Technologies (e.g., optical circuit-switched networks, packet-switched networks and various wireless cellular networks)

FIG. 1A is a block diagram illustrating one embodiment of an SDN Network 100a of the present invention, including a centralized SDN Controller 110 and a System Environment Monitor 115 for monitoring network nodes and extracting and analyzing real-time data reflecting the performance of SDN Network 100a at various levels of abstraction, including the Application Layer (containing various Application Components 120) and the lower-level Infrastructure Layer (containing routers, switches and various other DTT or Data Transfer Technology Devices 140).

Note that SDN Network 100a includes multiple different Data Transfer Technologies, including IP-based packet-switched networks (with DTT Devices such as Ethernet Switch 141 and Ethernet Router 146), optical circuit-switched networks (with DTT Devices such as Optical Cross Connect (MEMS) 153, Optical Cross Connect (electrical) 155, and Optical Multiplexer 160), as well as various wireless networks (including cellular 3G network 180 with DTT Devices such as UMTS Wireless device 185).

System Environment Monitor 115 monitors and extracts in real time Application Metadata 130 from Application Components 120 (utilized by various applications running on SDN Network 100a). SDN Controller 110 establishes communications with lower-level DTT Devices 140, both issuing control commands to and extracting lower-level Network Metrics 150 from such DTT Devices 140. In other embodiments, extraction of these lower-level Network Metrics can be accomplished (in whole or in part) by System Environment Monitor 115.

Before discussing the functionality of various network nodes of SDN Network 100a, it is important to emphasize the "cross-DTT" nature of SDN Network 100a. For example, System Environment Monitor 115 and SDN Controller 110 extract and analyze real-time data from Application Components 120 and DTT Devices 140 across multiple different DTTs. Similarly, SDN Controller 110 defines individual SDN Flows (not shown) that traverse multiple different DTTs. This "cross-DTT" functionality is of great significance, as will be discussed in greater detail below.

Moreover, as will also be discussed below, SDN Controller 110 is in a unique position, due to its knowledge of the entire system (mixed network) topology, to implement revised SDN Flows (e.g., based on real-time extraction and analysis of Application Metadata and Network Metrics, and predictive simulation of traffic) in a manner that avoids disrupting existing network traffic generated by applications currently running on the network.

Network 100a includes one embodiment of a wide variety of Application Components 120, utilized by one or more different companies or individuals. A company such as Amazon, for example, operates a website managed by Web Server 122, as well as an E-Commerce Storefront 124, which operates in conjunction with a variety of other Application Components 120. Users are authenticated by User Authentication 127 software, while data are managed by Storage Array 125 and security is maintained by a Security Monitor 126. Internally, employee scheduling is managed by Work Scheduling 121 software while time management is implemented via a Time Recording 128 component. Some or all of these Application Components 120 may generate logs (relating to performance, transactional data, errors, etc) managed by a centralized Audit Logging 123 component.

Individuals, such as User Clients 175, are also interconnected (e.g., via the Internet 170) with these other Application Components 120. In this embodiment, Internet 170 represents a particular Data Transfer Technology (DTT), in this case a packet-switched "network of networks." Various DTT Devices 140 interconnect these Application Components 120 to the Internet 170, including Ethernet Switches 141-145 and Ethernet Router 146. In other embodiments, various combinations of network switches, routers and other packet-switched devices can be employed.

As noted above, network 100a is a mixed technology network, including multiple different Data Transfer Technologies. For example, packet-switched Internet 170 is interconnected, via Ethernet Routers 146 and 147 (among other devices), with an optical circuit-switched DTT, including optical DTT Devices 140 such as Optical Cross-Connect (electrical) 155-157 switches in which switching is performed by electrical cross connect circuit switches (no access to bits, packets, etc.) connected to optical-to-electrical and electrical-to-optical converters, Optical Cross-Connect (MEMS) 153-154 and 158-159 switches in which switching is performed by pure optical circuit reconfiguration, and Optical Multiplexers 160-163. Optical Cross Connect switches may be based on MEMS or other optical switching technology and may provide wavelength selective (Wavelength selective switches) or wavelength independent switching (Optical Cross Connects) or various combinations of the above.

Moreover, Ethernet Routers 146 and 147 interconnect packet-switched Internet 170 to multiple wireless DTTs, such as Cellular 3G Network 180 (including DTT Devices 140 such as UMTS Wireless 185 device) and Cellular LTE Network 190 (including DTT Devices 140 such as LTE Wireless 195 device).

Finally, the optical circuit-switched DTT is also connected to other packet-switched DTT Devices 140, such as Ethernet Switches 148-149 and 151-152, which in turn are connected to a variety of Application Components 120, including User Clients 131, 137 and 138, and enterprise-level components for Order Management 132, Stock Control 133, Finance Ledgers 134, Payment Handling 136 and a centralized Database 135. As noted above, these enterprise-level components could facilitate applications shared by a single company or multiple different companies.

Note that, in the embodiment illustrated in FIG. 1A, Application Metadata 130 is collected from Application Components 120 by a centralized System Environment Monitor 115, while Network Metrics 150 at the Infrastructure Layer are collected from DTT Devices 140 by a centralized SDN Controller 110. Note also, as will be described in greater detail below, that SDN Controller 110 configures DTT Devices 140 by issuing SDN Flow control commands via the same connections used to extract Network Metrics 150. In other embodiments, Application Metadata 130 and Network Metrics 150 can be collected by various different devices (and software), whether in a centralized or more distributed manner.

Figure 1B:
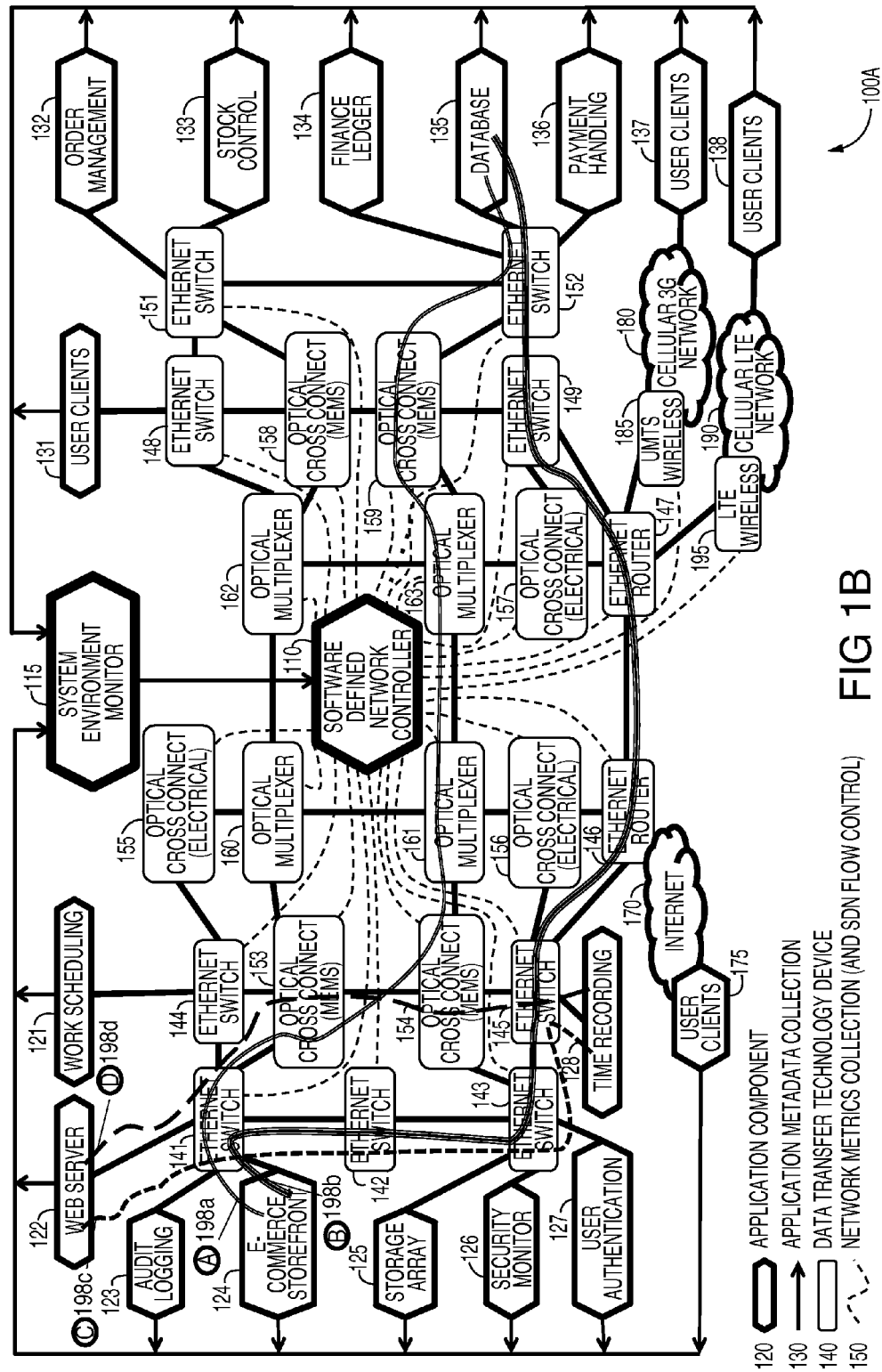
FIG. 1B is a block diagram illustrating alternative Paths for Dynamic Path Optimization in an embodiment of an overall system architecture of the System Environment of the present invention.

Turning to FIG. 1B, network 100b is a block diagram illustrating alternative SDN Flows for "Dynamic Path Optimization" of the same system topology illustrated in FIG. 1A. In this embodiment, SDN Controller 110 extracts and analyzes both Application Metadata 130 and Network Metrics 150 (as will be explained in greater detail below), the result of which is a revised set of SDN Flows designed to optimize for particular goals, such as a specific QoS or minimizing latency or network congestion.

For example, SDN Flow A 198a illustrates a communications path by which E-Commerce Storefront 124 communicates with Database 135, via various DTT Devices 140 and across multiple different Data Transfer Technologies (e.g., both an IP-based packet-switched network and an optical circuit-switched network). Messages initiated from E-Commerce Storefront 124 travel through Ethernet Switch 141 in the IP-based packet-switched network (first DTT), and then enter the optical circuit-switched network (second DTT) at Optical Cross-Connect (MEMS) 153. They continue in this second DTT through DTT Devices 154, 161, 163 and 159, after which they pass through Ethernet Switch 152 in the first DTT (IP-based packet-switched network) and are then received by Database 135.

Any application relying on this SDN Flow A 198a may experience unexpected problems (e.g., higher than normal latency, reduced throughput, etc), which it describes in its log files, extracted as Application Metadata 130 by System Environment Monitor 115 and reported to SDN Controller 110. Other problems may be detected directly by SDN Controller 110 (in one embodiment) by monitoring Network Metrics 150 at the Infrastructure Layer (e.g., slow ping times from a particular switch or router). As will be described in greater detail below, SDN Controller 110, upon identifying problems from this real-time extraction of data, implements various algorithms to analyze alternative SDN Flows and select those that best fulfill achieve its desired optimization goals.

In the example illustrated in FIG. 1B, SDN Controller 110 selects SDN Flow B 198b to replace SDN Flow A 198a. Note that messages initiated from E-Commerce Storefront 124 will now travel through Ethernet Switch 141 and remain entirely in the IP-based packet-switched network (passing through Ethernet Switches 142, 143 and 145, Ethernet Routers 146 and 147, and then Ethernet Switches 149 and 152 before being received by Database 135). The non-disruptive manner in which SDN Controller 110 implements such revisions and replacements of SDN Flows will also be described in greater detail below.

Similarly, SDN Flow C 198c illustrates a communications path by which Web Server 122 communicates with Time Recording software 128, in this case entirely in an IP-based packet-switched network (passing through Ethernet Switches 141, 142, 143 and 145 before being received by Time Recording software 128). Here too, SDN Controller 110 may select an alternative SDN Flow D 198d (in a manner similar to that noted above) to address a problem identified from real-time monitoring and extraction of Application Metadata 130 and Network Metrics 150.

As a result, messages initiated from Web Server 122 intended for Time Recording software 128 will still pass through Ethernet Switch 141 in the IP-based packet-switched network, but will then be routed to the optical circuit-switched network (passing through Optical Cross-Connect (MEMS) 153 and 154) before returning to the IP-based packet-switched network at Ethernet Switch 145 and then being received by Time Recording software 128. In other embodiments, alternative paths may utilize the same DTT (optical to optical, packet-switched to packet-switched, etc.), as well as various combinations of different DTTs.

Note that, in some cases, a particular DTT Device 140 may be the source of a problem, while in other cases, multiple DTT Devices 140 or the transition from one DTT to another (e.g., IP to optical, or vice versa) may increase latency, reduce overall bandwidth, or fail entirely. Moreover, in other embodiments, multiple SDN Flows may be employed for communications among two Application Components 120 (e.g., one for each direction, or multiple alternative SDN Flows in the same direction—e.g., for different types of communications).

It is important to emphasize the "cross-DTT" nature of both the analysis of extracted data and the selection and implementation of revised optimal SDN Flows which, as noted above, is facilitated by the ability of SDN Controller 110 to leverage its knowledge of the entire system topology and application-to-application traffic paths. Although the examples described above with reference to FIG. 1B illustrate individual SDN Flows, it should be noted that the complexity of the SDN Flows increases exponentially as multiple applications share Application Components 120 across multiple DTTs in a mixed network.

Turning to FIG. 2, block diagram 200 illustrates embodiments of an SDN Controller 210 and System Environment Monitor 215 of the present invention (also illustrated in FIGS. 1A and 1B as SDN Controller 110 and System Environment Monitor 115) in the context of a mixed technology (multi-DTT) network in which individual devices are physically connected, but not yet assigned SDN Flows.

SDN Controller 210 implements logically centralized Control Plane functionality for the various Application Components and DTT Devices (such as Application Components 120 and DTT Devices 140 in FIGS. 1A and 1B), which in turn implement the Forwarding Plane functionality of the network. System Environment Monitor 215 discovers new devices and their connectivity, and monitors the operation of the various Application Components and DTT Devices (with the assistance of SDN Controller 210) that make up the network.

In particular, System Environment Monitor 215 monitors certain real-time performance characteristics and other aspects of the system while applications are running, including Application Metadata derived from Application Components (number of concurrent users and running instances, database size, thread counts, transaction rates, message queue statistics, errors and problems reported in log files, etc.) as well as lower-level Network Metrics derived from DTT Devices (number of hops between nodes, bandwidth, latency, packet loss, etc.).

Prior to accepting connectivity requests 211, SDN Controller 210 establishes policy definitions and stores them in a repository, such as Policy Definitions DB (database) 255. For example, one simple policy might establish a minimum latency for an SDN Flow between any two nodes. By defining the detailed characteristics of the various connectivity policies supported by the system, clients or users of the system can initiate connectivity requests 211 without having to explicitly detail every such characteristic. For example, a "Gold" policy might be defined with specific values for minimum bandwidth, reliability, latency, cost, etc.

The precise characteristics for each DTT Device (or device type) are maintained in Data Transfer Technology Characteristics DB 265. These characteristics include, for example, latency, bandwidth, reconfiguration speed, cost, etc. In addition, the physical connectivity among DTT Devices (physical topology) and their configured connectivity (logical topology—e.g., input to output port connections on an optical switch and other SDN Flow info) are maintained in Data Transfer Topology DB 270. As will be explained in greater detail below, this information maintained in DBs 265 and 270 are utilized by Data Transfer Path Computation component 250 to determine the effect of each DTT Device on the overall end-to-end SDN Flow.

An Application Component (such as Web Server 122 in FIGS. 1A and 1B) might initiate a request for connectivity 211 in order to establish communications with another Application Component (e.g., Database 135). Similarly, routes between lower-level nodes, such as Ethernet routers, are also established. These connectivity requests 211 may originate from provisioning software or other modules of an Application Component or DTT Device firmware, or from a user that directs an Application Component, for example, to initiate connectivity between two network nodes. Individual network ports are typically specified, whether for an Application Component (e.g., a TCP port utilized by a web server) or a lower-level DTT Device (e.g., an input or output port of an Ethernet or optical switch).

Upon receiving a connectivity request 211, Connectivity Policy Manager 257 utilizes the policy info from Policy Definitions DB 255 to determine the precise characteristics of desired end-to-end connectivity paths (SDN Flows) across the network. It then issues requests to Data Transfer Path Computation component 250, which utilizes device info from Data Transfer Technology Characteristics DB 265 and network topology info from Data Transfer Topology DB 270 to derive optimal SDN Flows (as described in greater detail below with reference to FIGS. 4A and 4B). It also updates Data Transfer Topology DB 270 in accordance with the SDN Flow revisions.

Data Transfer Path Computation component 250 implements the revised SDN Flows via DTT Device Mediation component 225. Individual DTT Devices 220 (such as Ethernet 222, Optical 224 and wireless LTE 226 physical and virtual devices) implement the network's Forwarding Plane by transferring data from device to device across the network. FIG. 2 illustrates only these three examples of the many possible different Data Transfer Technologies that can be employed to transfer data.

In one embodiment, individual modules of DTT Device Mediation component 225, corresponding to each DTT, are employed to issue appropriate Configuration Commands 212 to, and extract Network Metrics from, their corresponding DTT Devices 220. In this embodiment, Ethernet module 227 issues "Ethernet-specific" Configuration Commands 212 to Ethernet DTT devices 222 to extract "Ethernet-specific" Network Metrics, while Optical module 228 issues "Optical-specific" Configuration Commands 212 to Optical DTT Devices 224 to extract "Optical-specific" Network Metrics, and LTE module 229 issues "LTE-specific" Configuration Commands 212 to LTE DTT Devices 226 to extract "LTE-specific" Network Metrics.

Configuration Commands 212 configure DTT Devices 200 to control the transmission of data across the Forwarding Plane of the network, while enabling communication with the Control Plane. Upon extracting these real-time Network Metrics, DTT Device Mediation component 225 relies upon Data Transfer Metric Collection component 240 to collect and organize these Network Metrics for forwarding to the Data Collector component 235 of System Environment Monitor 215.

As noted above, in one embodiment, Network Metrics are extracted by SDN Controller 210 while Application Metadata are extracted by System Environment Monitor 215. In other embodiments, the extraction of network data can be performed by a single module or allocated among various modules or physical devices.

While DTT Device Mediation component 225 collects these Network Metrics, Data Collector component 235 of System Environment Monitor 215 collects Application Metadata as well, and organizes this Application Metadata and the Network Metrics received from Data Transfer Metric Collection component 240 of SDN Controller 210. The data are translated to normalized forms where appropriate, indexed for faster searching and then stored (both processed data and indices) in Application Metadata & Network Metrics DB 275.

It should be noted that, in one embodiment, real-time extraction of Network Metrics (by DTT Device Mediation component 225) and Application Metadata (by Data Collector 235) is performed on a periodic basis. In other embodiments, such data extraction can be performed on demand, on an ad hoc basis or in accordance with virtually any other algorithmic schedule over time. In one embodiment, historical performance data (e.g., performance during particular times of day over the past year) are extracted and maintained to facilitate Predictive Optimization, as explained in greater detail below.

Data Collector 235 extracts Application Metadata from a wide variety of Application Components 230, including, for example, Database 232, Security Monitor 234 and E-Commerce Storefront 236. Whether embodied as software subsystems running on a physical or virtual computer platform, or as dedicated hardware appliances, Application Components 230 typically perform a portion of the overall functionality of a more complex application. For example, a web server might be the front-end component of a company's retail enterprise, which typically also includes databases and other back-end functionality. To fulfill the overall functionality of a complex application, Application Components 230 must exchange information across a network. The amount of data and frequency of data transfers can vary considerably over time among different Application Components 230, depending on a variety of factors.

In one embodiment, System Environment Monitor 215 continuously receives "on demand" external requests 216 to monitor an Application Component 230—e.g., from an application delivery controller or provisioning system, or from a user of the system requesting discovery and monitoring of a new Application Component 230. In other embodiments, such requests 216 are scheduled on a periodic or ad hoc basis, or in accordance with a more complex algorithm.

Upon receiving requests 216 to monitor new Application Components 230, System Environment Monitor 215 relies upon Application Component Topology Discovery component 280 to implement this task. Component 280 utilizes both the existing logical topology stored in Data Transfer Topology DB 270 of SDN Controller 210 and the extracted data stored in Application Metadata & Network Metrics DB 275 to identify which Application Components 230 have exchanged information, and to build over time an Application Component Topology DB 285 which is independent of the underlying Data Transfer Topology 270.

In other words, while Data Transfer Topology DB 270 maintains the physical and logical topology among DTT Devices 220, Application Component Topology DB 285 maintains the logical topology that identifies which Application Components 230 have communicated with one another. DB 285 can be used, for example, to determine when network performance issues affect the performance of the Application Components 230 utilized by a particular software application.

Application Data Transfer Analysis component 295 utilizes network topology info from DB 270 and DB 285, along with extracted data from Application Metadata & Network Metrics DB 275, to implement various network analytics functionality. In other words, Network Metrics extracted by SDN Controller 210 and Application Metadata extracted by System Environment Monitor 215 are collected and integrated by Data Collector 235, analyzed by Application Data Transfer Analysis component 295, and then utilized by Data Transfer Path Computation component 250 to identify network operation and performance problems and to derive revised SDN Flows that are optimized for various desired goals (i.e., Dynamic Path Optimization).

In one embodiment, this automated feedback loop (explained in greater detail below) runs continuously in real time—extracting network data from running applications and utilizing such data to generate "optimal" revised SDN Flows, from which subsequent network data is generated and extracted (completing the loop).

As noted above, Dynamic Path Optimization can optimize the performance of an individual software application (Application Optimization) or the system as a whole, encompassing all software applications currently running on a mixed technology (multi-DTT) network (System Optimization). Moreover, Application Data Transfer Analysis component 295 can also assist component 250 in this regard by testing proposed optimal SDN Flows against historical network traffic patterns (Predictive Optimization), including the following functionality:

(1) identifying network performance problems which impact the operation or performance of software applications currently running on the system;

(2) deriving historical network traffic patterns, including measures of congestion, latency, throughput, cost, power utilization, etc.; and (3) performing simulations of a proposed new DTT topology using the historical network traffic patterns to predict whether the proposed new DTT topology is more optimal than the current topology (i.e., Predictive Optimization).

In other embodiments, combinations of these various forms of Dynamic Path Optimization (e.g., optimizing for a set of software applications) can be performed continuously in real time, on demand or in accordance with a more complex schedule.

For example, to facilitate faster and more efficient Dynamic Path Optimization by Data Transfer Path Computation module 250, Application Component Topology Discovery module 280 may dynamically prioritize certain paths in Data Transfer Topology DB 270 directly, or indirectly via Application Component Topology DB 285 and Application Data Transfer Analysis module 295. The prioritization (i.e., assigning rank order) may favor or disfavor certain paths depending on analysis of data extracted via Data Collector 235.

Moreover, based on monitored performance of the network, SDN Controller 110 may automatically perform proactive actions before more extreme problems are detected, such as an optical device becoming unsuitable to transmit data. Examples of such proactive actions include:

(1) Changing an active traffic path (e.g., optical) to an alternate path (e.g., optical or electrical) if it is impaired, but before it fails (e.g., pre-FEC BER monitoring as a switching decision trigger);

(2) If a protection traffic path on standby (e.g., optical) shows signs of a potential failure, changing protection to an alternate path (e.g., optical power loss as a decision trigger);

(3) Adjusting power levels of optical transmitters; and (4) Adjusting gains of amplifiers;

(5) Adjusting power levels of other DTT Devices;

(6) Auto-balancing optical power levels;

(7) Increasing FEC strength of transmitter-receiver pairs; and (8) Switching a faulty circuit to a different one, if available.

Figure 3:
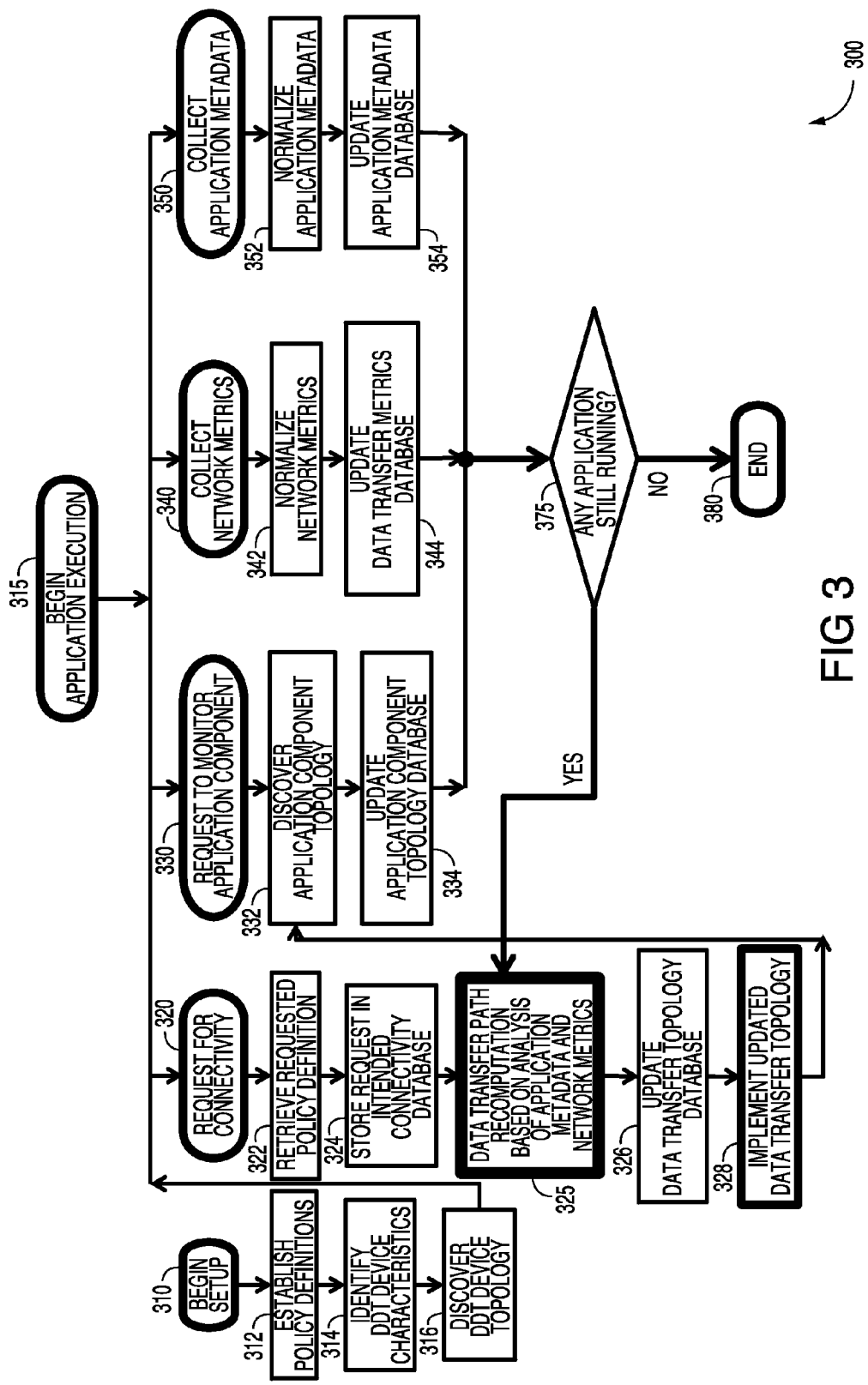
FIG. 3 is a flowchart illustrating one embodiment of an automated feedback process for Dynamic Path Optimization across Data Transfer Technologies, based on the monitoring and collection of Application Metadata and Network Metrics while Applications are running on the System Environment of the present invention.

Turning to FIG. 3, flowchart 300 illustrates one embodiment of this automated feedback process for Dynamic Path Optimization across multiple Data Transfer Technologies, based on the monitoring and collection of Application Metadata and Network Metrics while software applications are running on a mixed technology (multi-DTT) network. In this embodiment, an initial SETUP process 310 occurs after an SDN Controller and System Environment Monitor (such as those detailed in FIG. 2 above) are configured and Application Components and DTT Devices are physically interconnected, but before network topologies are discovered and application traffic is flowing across the network.

With reference to the components of SDN Controller 210 in FIG. 2, Policy Definitions DB 255 is initialized in step 312 with connectivity policies supported by the system. DTT Device characteristics are identified and stored in Data Transfer Technology Characteristics DB 265 in step 314 (including, for example, information about which devices can interoperate, along with their data rates, latency, setup time and other relevant characteristics and behaviors). Employing well-known techniques, the physical topology and connectivity of the DTT Devices is discovered and stored in Data Transfer Topology DB 270 in step 316.

Having completed the setup process, the system begins to receive connectivity requests 320 (e.g., for a new DTT Device) and monitoring requests 330 (e.g., for a new Application Component or communication path between Application Components). Requests 320 and 330 may be initiated by system administrators or other users, as well as from DTT Device firmware, Application Component initialization modules, and other sources. In one embodiment, the system also simultaneously begins to monitor the operation and performance of DTT Devices (to collect Network Metrics in step 340) and Application Components (to collect Application Metadata in step 350).

With respect to monitoring requests 330, System Environment Monitor 215 needs to discover the topology of Application Components in step 332 in order to begin to monitor them. Whether monitoring is initiated manually (e.g., by a user or system administrator) or systematically (e.g., by an initialization software module of an Application Component), each Application Component is identified by a computer system hostname, DTT Device port or some other distinguishing characteristic. Alternatively, System Environment Monitor 215 can utilize information from Data Transfer Topology DB 270 as a starting point to facilitate automatic discovery of Application Components (e.g., by monitoring Application Metadata from SDN Flow endpoints defined in DB 270).

Whether starting from manually-identified or discovered Application Components, Application Component Topology Discovery component 280 uses the information from the Data Transfer Topology DB 270 to determine which Application Components are associated by virtue of a data transfer relationship, which it then records by updating Application Component Topology DB 285 in step 334.

Note that step 332 is invoked not only in response to monitoring requests 330, but also in response to modifications of Data Transfer Topology DB 270, which in turn may result in changes to the logical topology of Application Components, and thus require an update to Application Component Topology DB 285 in step 334.

In one embodiment, the operation and performance of all Application Components known to System Environment Monitor 215 are monitored in real time by System Environment Monitor 215. Data Collector 235 gathers all available Application Metadata in step 350 using a variety of well-known techniques including reading log files, collecting syslog events, or monitoring the content of traffic passing among Application Components.

As noted above, Application Metadata is normalized in step 352, for example by mapping input data into a set of common data fields (e.g., to distinguish among different application log file formats) and employing keyword recognition to parse the input data. Data Collector 235 builds and continually maintains an index of the Application Metadata to enable fast and efficient searching. It then updates Application Metadata & Network Metrics DB 275 in step 354, including all gathered Application Metadata and index data associated with the various Application Components.

SDN Controller 210 collects Network Metrics in step 340 from Data Transfer Technology Devices, in one embodiment relying upon DTT Device Mediation component 225 as described above. It then relies upon Data Collector 235 in System Environment Monitor 215 to normalize the Network Metrics in step 342, and update Application Metadata & Network Metrics DB 275 in step 344. In other embodiments, separate databases are maintained for Application Metadata and Network Metrics.

After updating Application Component Topology DB 285 (in step 334) or Application Metadata & Network Metrics DB 275 (in step 354 or 344), SDN Controller 210 checks in step 375 to determine whether any software applications are still running. If no software applications are running, the process ends in step 380. In one embodiment, the system remains active indefinitely until a request 330 is received to monitor an Application Component.

If one or more software applications are still running, Connectivity Policy Manager 257 of SDN Controller 210 proceeds in step 325 to recompute "optimal" SDN Flows based on an analysis of Application Metadata and Network Metrics. Step 325 will be described in greater detail below with respect to FIGS. 4A and 4B.

Step 325 is also performed in response to connectivity requests 320 regarding DTT Devices. Typical connectivity requests 320 include port identifiers on endpoint DTT Devices and an initial target policy. Connectivity Policy Manager 257 retrieves the requested policy definition from Policy Definitions DB 255 in step 322. For example, a "Low Latency Gold" policy might be defined in Policy Definitions DB 255 with specific values for latency, bandwidth, reliability and other factors. In one embodiment, Connectivity Policy Manager 257 also stores request 320 in an "intended connectivity" database in step 324 before proceeding to step 325 to recompute "optimal" SDN Flows.

As will be explained in greater detail below with respect to FIGS. 4A and 4B, step 325 is invoked to recompute optimal SDN Flows in response to connectivity requests 320 regarding DTT Devices and monitoring requests 330 regarding Application Components, as well as in response to updates to Application Metadata & Network Metrics DB 275 (based on collection of Network Metrics in step 340 and Application Metadata in step 350).

In other words, Data Transfer Path Computation component 250 of SDN Controller 210 is triggered to recompute "optimal" SDN Flows in step 325 both by changes to the network topology and by problems it detects in the operation and performance of software applications running on the network. It then updates Data Transfer Topology DB 270 with the new SDN Flows in step 326, and proceeds to implement the updated Data Transfer Topology in step 328.

As discussed above with respect to FIG. 2, Data Transfer Path Computation component 250 passes a description of the chosen "optimal" paths (in terms of explicit hop-by-hop topology) to DTT Device Mediation component 225, which then decomposes the paths into a set of configuration commands 212 to be sent to each of the DTT modules (227, 228 and 229). In one embodiment, explained in greater detail below with respect to FIGS. 5, 6A and 6B, step 328 is implemented in a "non-disruptive" manner to avoid disrupting existing SDN as well as other real-time network traffic generated by applications currently running on the network.

Figure 4A:
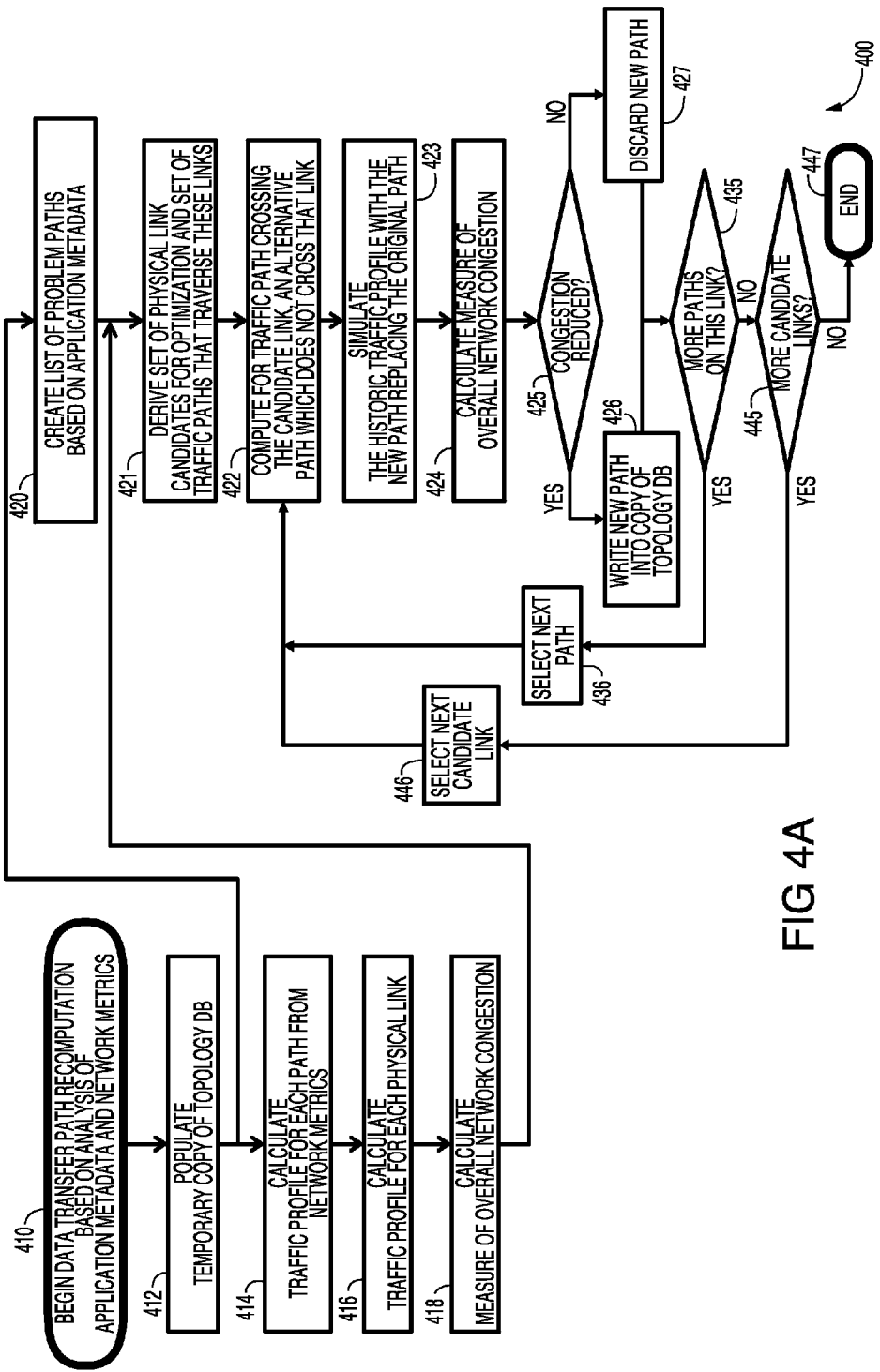
FIG. 4A is a flowchart illustrating one embodiment of the Dynamic Path Recomputation step of FIG. 3.

Turning to FIG. 4A, flowchart 400 illustrates one embodiment of Dynamic Path Recomputation step 325. In this embodiment, the process of computing "optimal" SDN Flows is performed without regard to the differences among different Data Transfer Technologies. FIG. 4B, discussed below, illustrates an alternative embodiment that takes certain of these differences into account.

Data Transfer Path Computation component 250 of SDN Controller 210 initiates step 410 whenever step 325 of FIG. 3 is invoked, providing access to Data Transfer Topology DB 270 as well as current Application Metadata and Network Metrics extracted from respective Application Components and DTT Devices. To understand the concept of SDN Flows, consider the distinction between the "physical link" between two adjacent DTT Devices (e.g., a fiber-optic cable) and the "traffic path" between two Application Components, which may flow across many DTT Devices (nodes). It is the set of "partial" consecutive SDN Flows at each intermediate node that determines how data are passed from node to node across the network.

In the embodiment illustrated in FIG. 4A, Data Transfer Path Computation component 250 implements an iterative algorithm to reduce the number of individual traffic paths which experience problems (such as congestion, high latency and eventually failure), thereby improving the overall performance of the software applications running on the network by revising existing SDN Flows to alternate routes across the network. Other algorithms may of course be implemented to achieve other "optimizations" of various operational and performance factors (for individual or groups of software applications as well as the entire system) without departing from the spirit of the present invention.

In step 412, Data Transfer Path Computation component 250 populates a temporary copy of Data Transfer Topology DB 270, which can be adjusted iteratively (e.g., to test potential revised SDN Flows) without affecting the network's actual topology. It then creates a list of "problem" traffic paths, in step 420, based upon Application Metadata collected and analyzed over time—in one embodiment, by System Environment Monitor 215, which monitors software application response times, message queue timings, timeout errors in application logs, etc.

In addition to identifying problems at the Application Layer, Data Transfer Path Computation component 250 also relies on lower-level Network Metrics to identify potential sources of such problems. It derives, in step 414, a traffic profile for each SDN Flow, based on the Network Metrics collected over time (e.g., one-minute samples of average bandwidth). A similar traffic profile can be calculated, in step 416, for each physical link (e.g., by directly monitoring DTT Devices or deriving aggregate SDN Flow traffic profiles—since many SDN Flows can pass over the same physical link, sharing the available bandwidth).

In step 418, component 250 then implements an algorithm to derive a measure of congestion of the network as a whole. For example, it could simply count physical links where the traffic profile exceeds 90% of available bandwidth, or latency exceeds 50 ms for more than five sample periods. As noted above, other algorithms could be employed to measure other desired optimization goals for one or more software applications or for the system as a whole, relying on "snapshot" or periodic real-time measurements and/or historical data compiled over time.

In step 421, component 250 then uses the traffic path and physical link data from step 418, and the set of "problem" Application Layer traffic paths from step 420, to create a list of physical link candidates for optimization. For example, one approach could require that a physical link candidate exhibit one of the following criteria:

(a) Aggregate traffic profile of the physical link exceeds a predefined threshold capacity;
(b) Application Metadata generated for an Application Component associated with one of the SDN Flows crossing the physical link showed response times above a predefined threshold; or
(c) One or more SDN Flows crossing the physical link dropped a number of packets exceeding a predefined threshold.

Obviously, various other criteria could be defined to identify candidate links, depending upon the desired optimization goals. In any event, once a set of physical link candidates is identified, component 250 identifies the list of SDN Flows that traverse that physical link candidate.

It then processes (in an "outer loop") each physical link candidate in step 422. For each SDN Flow that traverses the physical link candidate, component 250 derives an alternative SDN Flow that does not include that physical link candidate. In other embodiments, a set of alternative SDN Flows can be derived, each being processed in turn in an "intermediate loop."

Many well-known path calculation algorithms exist (e.g., Dijkstra, Kruskal, etc.) for recalculating SDN Flows after removing the physical link candidate. The result is a new alternative SDN Flow (or set of alternative SDN Flows) which connects the same Application Components as the "original" (current) SDN Flow it replaces, but is routed to avoid the physical link candidate. In other embodiments, such algorithms could be further optimized to avoid other congested physical links and/or biased toward physical links that are less utilized.

Component 250 then processes (in an "inner loop") the alternative SDN Flow in step 423. It replaces the current SDN Flow in Data Transfer Topology DB 270 with the alternative SDN Flow, effectively creating a new topology, and simulates what the historic traffic profile would have looked like for that new topology. In one embodiment, each physical link along the alternative SDN Flow is assessed. The previously observed traffic profiles for all SDN Flows that include that physical link are summed, thereby generating a traffic profile for that physical link. These calculated traffic profiles for each physical link in the alternative SDN Flow are then summed to generate a simulated traffic profile for the alternative SDN Flow.

Component 250 then reassesses the overall network congestion in step 424—i.e., performing the calculation from step 418 with the new topology and simulated traffic profile for the alternative SDN Flow being processed. It then compares, in step 425, this simulated measure of network congestion with the value previously obtained in step 418. If the level of congestion has been reduced, Data Transfer Topology DB 270 is updated, in step 426, with the alternative SDN Flow replacing the current SDN Flow. Otherwise, the alternative SDN Flow is discarded in step 427.

In either case, component 250 then determines, in step 435, whether additional SDN Flows that traverse the candidate physical link remain to be processed. If so, it selects, in step 436, the next SDN Flow (from the list generated in step 421) and repeats step 422 for that SDN Flow (i.e., until the list of SDN Flows traversing the candidate physical link is exhausted).

Once that list is exhausted (as determined in step 435), component 250 then determines, in step 445, whether any candidate physical links remain to be processed. If so, it selects, in step 446, the next candidate physical link (from the list generated in step 421) and repeats step 422 for each SDN Flow that traverses that candidate physical link (until, eventually, the list of candidate physical links is exhausted, at which point the process terminates at step 447—at least until step 325, and thus step 410, is again invoked).

In other embodiments, the process illustrated in flowchart 400 can be performed on a periodic basis (rather than "on demand") or in accordance with another algorithm. For example, after a predefined amount of time has passed, the measure of network congestion could be assessed as described above in step 418, and the process allowed to continue only if network congestion had not yet been reduced by a predefined threshold margin.

It should be emphasized that various alternative algorithmic optimizations could be performed, as compared to this relatively simplistic approach of reducing the number of congested physical links as a coarse measure of overall network throughput. For example, optimization goals could include maximizing network throughput or bandwidth, as well as minimizing latency, overall number of ports or DTT Devices in use, power consumption, error rates, or combinations of these various factors. Moreover, the system could optimize for these factors across individual or multiple SDN Flows or software applications, or combinations thereof, all without departing from the spirit of the present invention.

As noted above, FIG. 4A does not illustrate the consequences resulting from the differences among different Data Transfer Technologies. Flowchart 450 in FIG. 4B, however, illustrates an alternative embodiment that takes certain of these differences into account, beginning with step 460, analogous to step 410 of FIG. 4A. In the case of a mixed technology (multi-DTT) network (e.g., with both IP-based packet-switched and optical circuit-switched devices), there exist additional opportunities to optimize the network by employing variations of the techniques discussed above.

Note that different transport technologies exhibit different device characteristics, and thus place different constraints upon the optimization process. For example, an IP-based packet-switched network is generally more flexible than an optical circuit-switched network, in that it can simultaneously support many different data streams with different endpoints. Each packet stream transiting through a given port of an IP-based network device can be sent to different destinations, whereas all packet streams transmitted on a given wavelength across optical network devices must follow the same network route between source and destination endpoints. Yet, optical circuit-switched networks typically have lower latency than IP-based packet-switched networks, provide connectivity across longer distances, and use less power per network port. These differing characteristics can be exploited during the optimization process.

For example, MEMS devices in an optical circuit-switched network can be employed as an adjunct to an IP-based packet-switched network to reduce congestion on the packet-switched network, thus reducing the number (and thus the cost) of packet devices as well as overall power consumption. The SDN Flows discussed above with respect to FIG. 1B illustrate this point. Consider the two different SDN Flows A and B (198a and 198b, respectively) between E-Commerce Storefront 124 and Database 135. SDN Flow B 198b relies exclusively on the packet-switched network, while network traffic on SDN Flow A 198a starts in the packet-switched network, transits through the circuit-switched network and then returns to the packet-switched network.

While it may seem obvious to reroute network traffic from SDN Flow B 198b to SDN Flow A 198a, it should be noted that other SDN Flows (e.g., from Application Components 122, 123 and 124) may transit between Ethernet Switch 141 and Optical Cross-Connect (MEMS) 153, but with different destination endpoints. By selecting SDN Flow A 198a, if only a single optical port were available for network traffic between Ethernet Switch 141 and Optical Cross-Connect (MEMS) 153, then network traffic on SDN Flow D 198d could not utilize that portion of its path because such network traffic is destined for a different endpoint (Time Recording module 128). In other words, in addition to understanding the tradeoffs among different Data Transfer Technologies, one must also consider the consequences of selecting alternative SDN Flows, such as increased network congestion, unavailability of physical ports, or use of other limited physical and/or logical resources.

Figure 4B:
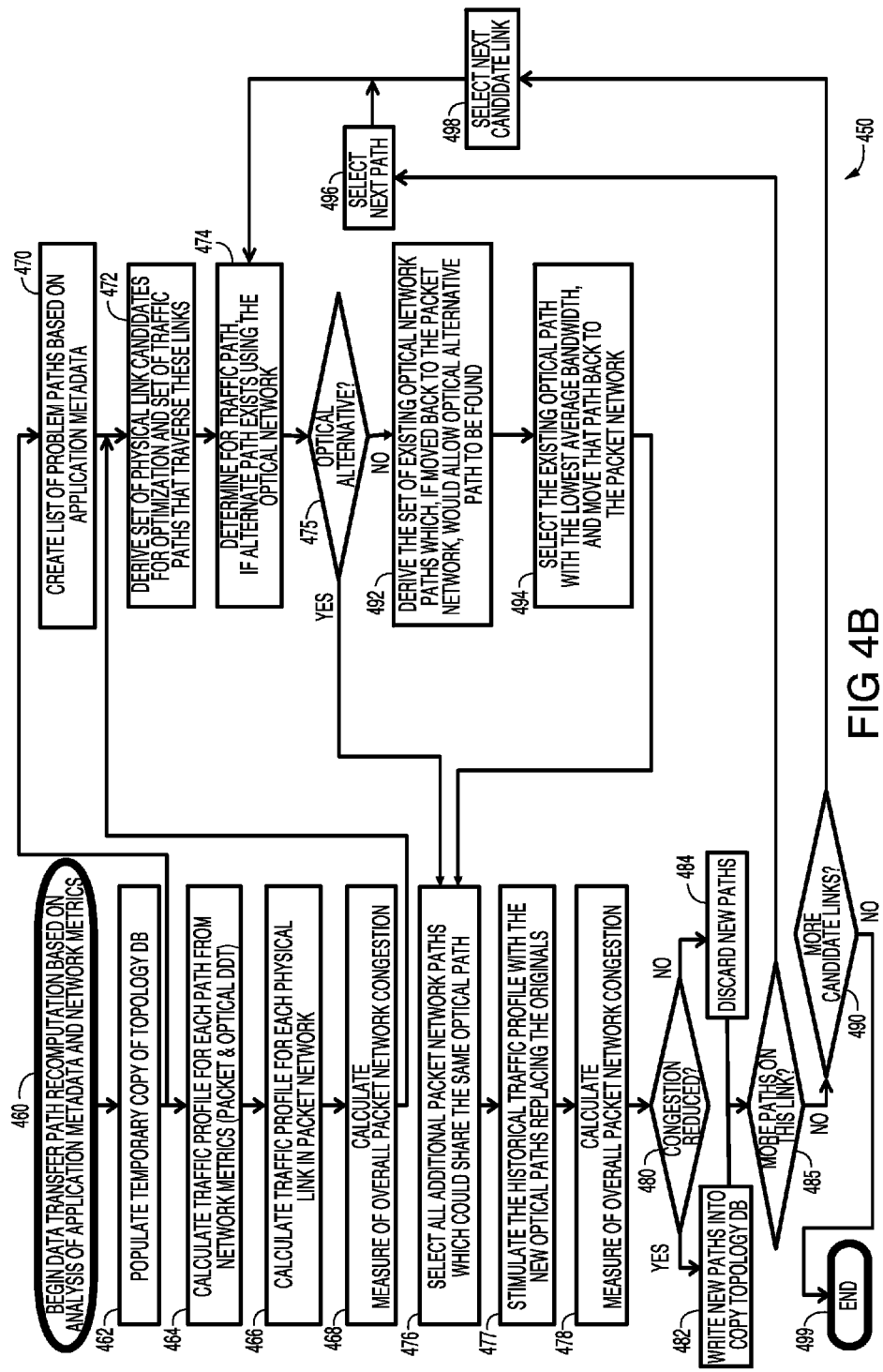
FIG. 4B is a flowchart illustrating an alternative embodiment of the Dynamic Path Recomputation step of FIG. 3 involving multiple Data Transfer Technologies.

Flowchart 450 in FIG. 4B illustrates an iterative process of simulating the traffic patterns that would result if a given traffic path was moved from a packet network to an optical network for the purpose of relieving congestion detected in the packet network. As in FIG. 4A, Data Transfer Path Computation component 250 populates, in step 462, a temporary copy of Data Transfer Topology DB 270, and creates, in step 470, a list of "problem" traffic paths based upon Application Metadata collected and analyzed over time.

Again it relies on lower-level Network Metrics to identify potential sources of such problems. And it derives, in step 464, a traffic profile for each SDN Flow, based on the Network Metrics collected over time, in this case from both packet-switched and circuit-switched DTT Devices. And it calculates a similar traffic profile for each physical link in step 466, again taking into account the fact that many SDN Flows can pass over the same physical link, sharing the available bandwidth.

In step 468, it implements an algorithm to derive a measure of congestion of (in this embodiment) the packet-switched network. Component 250 then uses the traffic path and physical link data from step 468, and the set of "problem" Application Layer traffic paths from step 470, to create, in step 472, a list of physical link candidates for optimization, as well as a set of SDN Flows that traverse that physical link.

However, in step 474, while processing (in an "outer loop") each physical link candidate, and (in an "inner loop") each SDN Flow that traverses that physical link, component 250 not only seeks to identify alternative SDN Flows which avoid traversing that physical link (as in FIG. 4A), but limits those alternative SDN Flows to those that cross from the packet-switched network into the optical circuit-switched network. In other words, it seeks an "optical alternative" to reduce the congestion in the packet network.

If no such optical alternative exists (tested in step 475), it identifies, in step 492, the set of existing "optical paths" (i.e., SDN Flows that traverse that same "entry point" from the packet network into the optical network) that, if moved back to the packet network, would "free up" an optical alternative. In this embodiment, component 250 then selects, in step 494, the optical path with the lowest average bandwidth, and moves that optical path back to the packet network (for simulation purposes). Of course, different algorithms could be employed in other embodiments, such as simulating all optical alternatives, prioritizing the selection of an optical alternative to those that exhibit low latency, etc.

Once an optical alternative has been identified (either via a successful test in step 475, or by moving an existing optical path back to the packet network in step 494), component 250 then selects, in step 476, all SDN Flows in the packet network that could share that same path from the packet network to the optical network. It then simulates, in step 477, the historical traffic profile with the new optical alternatives replacing the original (existing) SDN Flows, and, in step 478, reassesses the overall congestion of the packet-switched network.

In step 480, it compares the simulated level of congestion from step 478 with the existing level of congestion calculated in step 468 to determine whether the optical alternatives would reduce this level of congestion. If so, Data Transfer Topology DB 270 is updated, in step 482, with the optical alternatives replacing the current ("packet only") SDN Flows. Otherwise, the optical alternatives are discarded in step 484.

Component 250 then determines, in step 485, whether any additional SDN Flows that traverse the candidate physical link (identified in step 472) remain to be processed. If so, it selects, in step 496, the next SDN Flow (from the list generated in step 472) and repeats step 474 for that SDN Flow (i.e., until the list of SDN Flows traversing the candidate physical link is exhausted).

Once that list is exhausted (as determined in step 485), component 250 then determines, in step 490, whether any candidate physical links remain to be processed. If so, it selects, in step 498, the next candidate physical link (from the list generated in step 472) and repeats step 474 for each SDN Flow that traverses that candidate physical link (until, eventually, the list of candidate physical links is exhausted, at which point the process terminates at step 499—at least until step 325, and thus step 460, is again invoked).

As noted above, Dynamic Path Optimization, such as that illustrated in FIGS. 4A and 4B, can be performed across one or more DTTs, based on the monitoring and collection of Application Metadata and Network Metrics (also across one or more DTTs) while software applications are running on the system. Moreover, it can optimize for overall System Performance, individual Application Performance and/or Predictive Performance over time.

Once Dynamic Path Optimization has been performed and alternative "optimal" SDN Paths have been identified (and updated in Data Transfer Topology DB 270), such SDN Paths must be implemented across the network. As noted above, and illustrated in FIGS. 5 and 6A-6B, the replacement of SDN Paths is performed in real time, in accordance with the present invention, in a non-disruptive manner to avoid costly software application downtime or errors.

Figure 5:
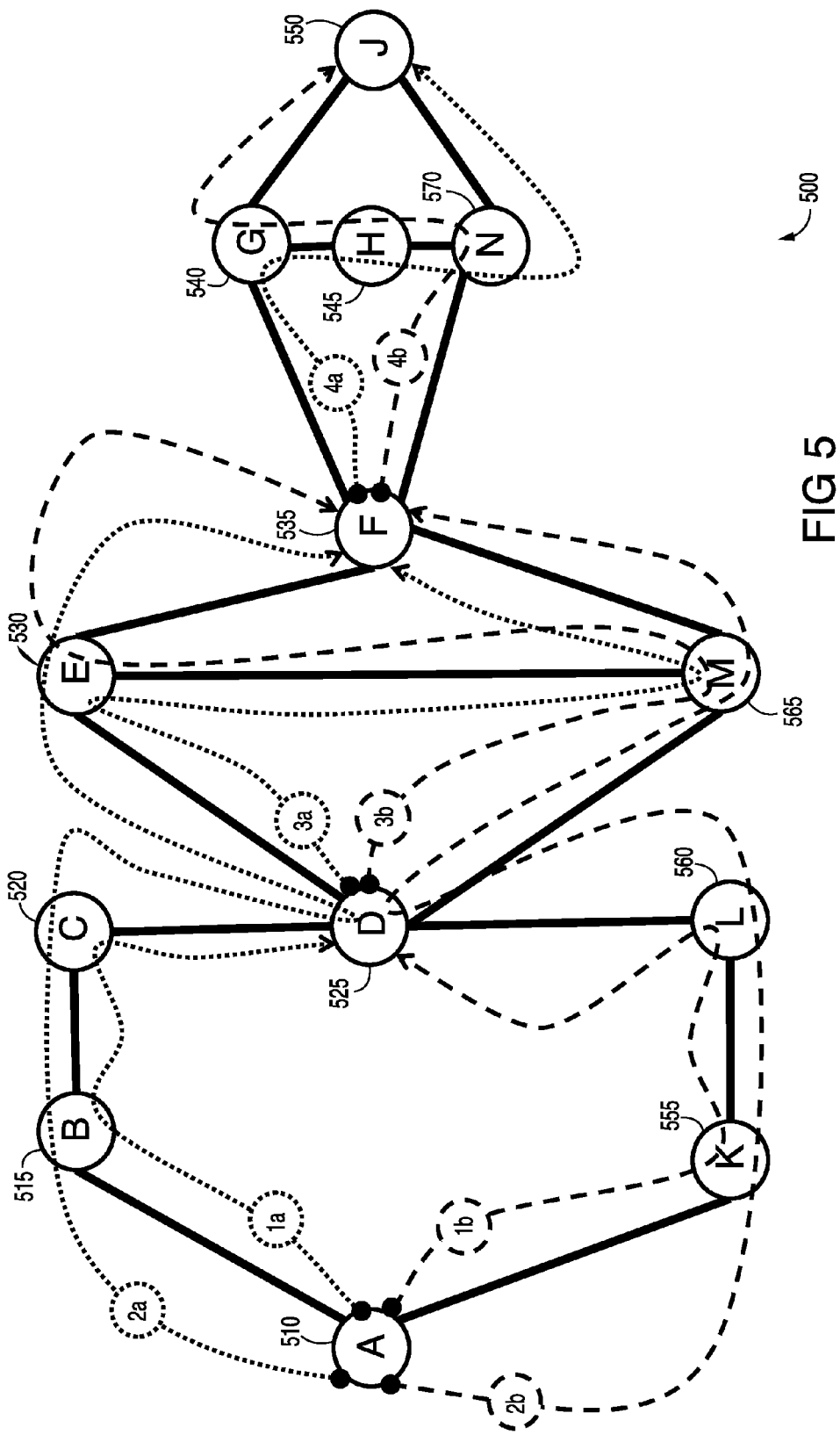
FIG. 5 is a graph illustrating various embodiments of the Implement Updated Data Transfer Topology step of FIG. 3.

Turning to FIG. 5, graph 500 illustrates various embodiments of the Updating Data Transfer Topology step of FIG. 3. In particular, graph 500 illustrates interconnected network nodes A 510, B 515, C 520, D 525, E 530, F 535, G 540, H 545, J 550, K 555, L 560, M 565, and N 570. In addition, graph 500 illustrates four sets of "before and after" SDN Paths which are implemented in a non-disruptive manner by flowchart 600 in FIG. 6A (where no common intermediate nodes are present between existing and desired paths) and flowchart 650 in FIG. 6B (where one or more common intermediate nodes are present between existing and desired paths).

For example, SDN Path 1a represents an existing SDN Path between node A 510 and node D 525 (i.e., A-B-C-D), while SDN Path 1b represents its desired replacement SDN Path between node A 510 and node D 525 (i.e., A-K-L-D). Note the lack of any common intermediate nodes between SDN Path 1a and SDN Path 1b. Flowchart 600 of FIG. 6A (discussed below) illustrates one embodiment of a non-disruptive algorithm for replacing an SDN Path (e.g., SDN Path 1a) with another SDN Path (e.g., SDN Path 1b) in the scenario in which the "before and after" SDN Paths share no common intermediate nodes.

However, all other "before and after" SDN Paths illustrated in FIG. 5 share at least one common intermediate node. For example, "before" SDN Path 2a between node A 510 and node F 535 (A-B-C-D-E-F) shares intermediate node D 525 in common with "after" SDN Path 2b between node A 510 and F 535 (A-K-L-D-M-F). Moreover, "before" SDN Path 3a between node D 525 and node F 535 (D-E-M-F) shares 2 intermediate nodes (E 530 and M 565) with "after" SDN Path 3b between node D 525 and node F 535 (D-M-E-F)—albeit in reverse order. Similarly, "before" SDN Path 4a between node F 535 and node J 550 (F-G-H-N-J) shares 3 intermediate nodes (G 540, H 545 and N 570) with "after" SDN Path 4b between node F 535 and node J 550 (F-N-H-G-J)—also in reverse order.

Figure 6A:
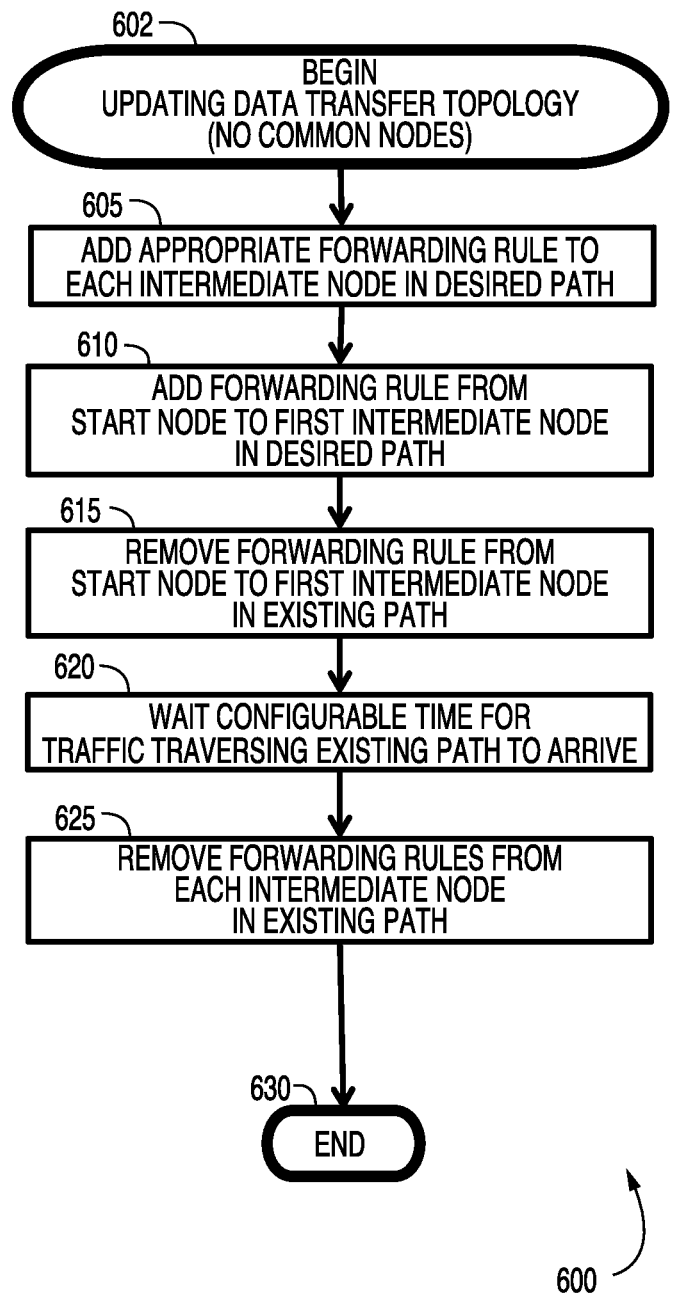
FIG. 6A is a flowchart illustrating one embodiment of a non-disruptive algorithm utilized in the Implement Updating Data Transfer Topology step of FIG. 3 in the scenario of FIG. 5 in which no common intermediate nodes are present between existing and desired paths.

Turning to FIG. 6A, flowchart 600 illustrates a non-disruptive algorithm utilized in the Implement Updated Data Transfer Topology step 325 of FIG. 3. In particular, it addresses the replacement of an SDN Path with one that shares no common intermediate nodes with the one being replaced.

Note that a primary goal of this process is to facilitate a "hitless update"—i.e., a reconfiguration of the logical traffic paths in the network without triggering a loss of connectivity. Other goals include avoiding reductions in network bandwidth or throughput, as well as other significant interruptions in the operation of any of the software applications running on the network at the time of the reconfiguration.

It should be emphasized that SDN Controller 210 is in a unique position to implement this process by leveraging its knowledge of the network topology and application-to-application traffic paths. In addition to this knowledge, SDN Controller 210 has programmatic control over the Forwarding Plane functionality implemented by the various DTT Devices on the network (as described above with reference to FIG. 2). It defines forwarding rules on each DTT Device, in one embodiment, based on its ingress port, egress port and a bit-mask.

Among the various obstacles to the implementation of this process is the fact that individual DTT Devices place physical limits on the number of concurrent forwarding rules they support. Moreover, the physical links among the DTT Devices place physical limits on bandwidth as well as connectivity.

With these constraints in mind, the process begins at step 602 once the Implement Updated Data Transfer Topology step 325 of FIG. 3 is invoked, and it is determined that the "before and after" SDN Paths share no common intermediate nodes. In step 605, SDN Controller 210 adds the appropriate forwarding rule concurrently to each intermediate node in the desired SDN Path. For example, with reference to "after" SDN Path 1b from FIG. 5 (A-K-L-D), a forwarding rule is added to node K 555 to implement the K-L portion of the path, and a forwarding rule is added to node L 560 to implement the L-D portion of the path. Note that, at this point, all relevant traffic will still be following existing "before" SDN Path 1a (A-B-C-D) because traffic from node A 510 is still being forwarded to node B 515.

In step 610, the "after" forwarding rule (from node A 510 to node K 555) is added to the initial node A 510 in SDN Path 1b. Then, in step 615, the existing "before" forwarding rule (from node A 510 to node B 515) is removed from node A 510. SDN Controller 210 then waits, in step 620, e.g., a predetermined and configurable amount of time for network traffic currently traversing SDN Path 1a to arrive at its intended destination (node D 525). Alternatively, SDN Controller 210 waits until receiving a confirmation that the "before" path is no longer carrying traffic.

After that time has elapsed, SDN Controller 210 removes, in step 625, all of the existing forwarding rules from the intermediate nodes in "before" SDN Path 1a (i.e., node B 515 and node C 520). Note that, since the "A-B" forwarding rule was removed, a sufficient amount of time has elapsed for all network traffic forwarded from node A 510 to node B 515 to arrive at its intended destination (node D 525). All subsequent relevant network traffic will have been forwarded from node A 510 to node K 555, thereby implementing a "hitless update" to "after" SDN Plan 1b.

Figure 6B:
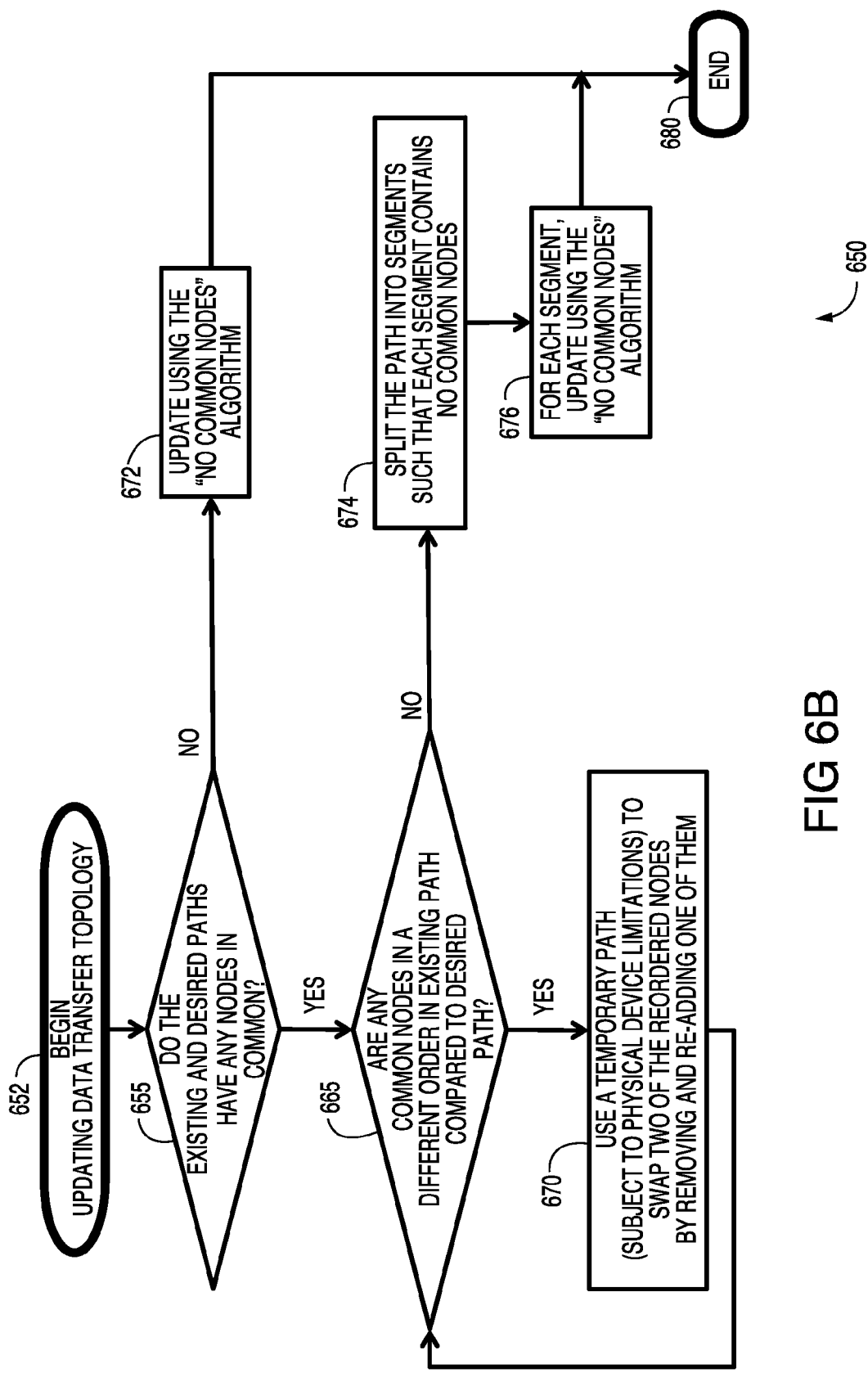
FIG. 6B is a flowchart illustrating one embodiment of a non-disruptive algorithm utilized in the Implement Updating Data Transfer Topology step of FIG. 3 in the scenario of FIG. 5 in which one or more common intermediate nodes are present between existing and desired paths.

Turning to flowchart 650 in FIG. 6B, the process begins at step 652 (once the Implement Updated Data Transfer Topology step 325 of FIG. 3 is invoked, as in FIG. 6A). Then, in step 655, SDN Controller 210 compares the "before and after" SDN Paths to determine whether they share any common intermediate nodes. If not, then, at step 672, SDN Controller 210 implements the "no common intermediate nodes" algorithm described above in flowchart 600 of FIG. 6A, after which the process ends at step 680.

Otherwise, SDN Controller 210 compares the "before and after" SDN Paths in step 665 to determine whether they share two or more common intermediate nodes in a different order (e.g., SDN Paths 3a-3b and SDN Paths 4a-4b). If not (as in SDN Paths 2a-2b), then the "before and after" SDN Paths are split into path segments in step 674 such that each segment does not contain any common intermediate nodes. Then, in step 676, SDN Controller 210 implements, for each segment, the "no common intermediate nodes" algorithm described above in flowchart 600 of FIG. 6A, after which the process ends at step 680.

The segments generated in step 674 start at the source node and run to the first common intermediate node, then to the second intermediate node (if any), and so on. In the case of SDN Paths 2a-2b, for example, which share only one common intermediate node (node D 525), two path segments are generated. The first segment in SDN Path 2a would be A-B-C-D, while the first segment in SDN Path 2b would be A-K-L-D. The second segment in SDN Path 2a would be D-E-F, while the second segment in SDN Path 2b would be D-M-F. Note that neither set of segments shares any common intermediate nodes.

However, if SDN Controller 210 determines, in step 665, that the "before and after" SDN Paths share two or more common intermediate nodes in a different order, then it creates temporary paths to swap any two of the common intermediate nodes—by removing (temporarily) one of the common intermediate nodes from the existing "before" SDN Path, and then re-adding it to effectuate the swap.

Then, it repeats step 665 to determine whether it still shares two or more common intermediate nodes, in a different order, with the "after" SDN Path. If not, then it performs step 674 to split the SDN Paths into segments (as explained above with respect to SDN Paths 2a and 2b) and step 676 to implement the "no common intermediate nodes" algorithm for each segment.

If, however, the "before and after" SDN Paths still share two or more common intermediate nodes in a different order, then it repeats step 670 (and step 665) until the SDN Paths no longer share two or more common intermediate nodes in a different order, at which point it then repeats steps 674 and 676. Note that ability of the system to identify temporary paths in step 670 is subject to physical device limitations, network congestion, available bandwidth, etc.

With respect to SDN Paths 3a (D-E-M-F) and 3b (D-M-E-F), step 665 would be repeated only once. Either node M 565 would be removed from SDN Path 3a and then re-added before node E 530 to effectuate the swap (resulting in D-M-E-F), or node E 530 would be removed and re-added after node M 565, also resulting in D-M-E-F.

However, with respect to SDN Paths 4a (F-G-H-N-J) and 4b (F-N-H-G-J), this "loop" of step 670 and 665 would be repeated multiple times. For example, if nodes G 540 and H 545 are initially swapped, yielding F-H-G-N-J, then nodes H 545 and N 570 would still be "out of order" and require another swap in step 670, yielding F-N-G-H-J, which would require a final swap of G 540 and H 545 (again) to finally yield F-N-H-G-J, at which point the process would proceed to step 674. In one embodiment, well-known algorithms are employed to minimize the required number of "swaps" performed in step 670 to yield the desired SDN Path.

In summary, as demonstrated above, SDN Controller 210 is invoked to reoptimize SDN Paths under various conditions while software applications are running on the system, and Application Metadata and Network Metrics are being collected in real time. For example, a user may initiate a request for such a reoptimization upon detecting a "problem" with one or more software applications or a particular DTT Device. Alternatively, SDN Controller 210 may itself automatically detect a problem and initiate such a request (e.g., based upon the detection of a new Application Component or DTT Device, the extraction and analysis of Application Metadata and Network Metrics, or other "real-time" or historical change in the operation of the network).

In one embodiment, this reoptimization of SDN Paths involves an iterative algorithm to reduce the number of individual SDN Paths that experience congestion by generating alternate routes across the network. SDN Controller 210 derives network traffic graphs based on the Network Metrics collected over time (e.g., a set of average bandwidth in half-hour samples). It then overlays time periods where Application Metadata monitoring indicates a problem or poor performance of one or more software applications using existing SDN Paths. If software application performance problems are indicated in a sampling period where the network utilization is relatively high, for example, then the applicable SDN Paths are deemed candidates for optimization. Moreover, as an enhancement to this process, analysis of Application Metadata may indicate whether the problem is related to throughput, latency or some other network characteristic, and optimize specifically for that characteristic.

Having detected SDN Path "problem" candidates, SDN Controller 210 derives a set of possible alternative SDN Paths across the network (e.g., between Application Components). In one embodiment, each candidate SDN Path is assigned a rank order based on the network characteristics desired to be optimized for particular network services (e.g., latency, throughput, etc.), which in turn is based on the original request as well as the observed requirements of the Application Components and DTT Devices.

As described above, the system simulates network performance (overall, or of one or more software applications) in one embodiment by selecting "top-ranked" SDN Paths, overlaying them across the network topology and combining previously generated traffic graphs or profiles. SDN Controller 210 then determines whether the cumulative sum of all the traffic paths that share a particular physical link has relieved (or exacerbated) network congestion. This simulation is repeated iteratively (selecting next-ranked alternative SDN Paths) until a set of SDN Paths is found which, for example, decreases the number of SDN Paths that would have experienced congestion using the historical data. SDN Controller 210 then implements these SDN Paths in the network in a non-disruptive manner as described above.

As noted above, reducing the number of congested (or otherwise non-optimal) physical links is but one form of network optimization, whether applied to the network as a whole (System Optimization) or limited to one or more software applications (Application Optimization), and whether based on historical (as well as real-time) Application Metadata and Network Metrics extracted while software applications are running on the network (Predictive Optimization). Other measures of "optimal" performance could be employed, such as latency, throughput, pre-FEC bit error rate degradation, or even power consumption of DTT Devices or components thereof, individually or in the aggregate.

Moreover, in a mixed technology (multi-DTT) network, various performance characteristics unique to a particular DTT can be detected and combined, and ultimately controlled as a consequence of the optimization process of the present invention. For example, a performance metric extracted from an optical amplifier in a particular optical DTT Device (e.g., an Optical Switch) might contribute to a higher-level problem detected in a software application that communicates over one or more SDN Paths that cross both packet and optical DTTs. The "optimal solution" may be an alternative set of re-routed SDN Paths that utilize a different Optical Switch and/or require dynamic reconfiguration of one or more optical cross connects or dynamic tuning of one or more transmitting lasers to implement the revised SDN Paths.

Thus, by leveraging the mixed technology (multi-DTT) nature of a network, and the centralized knowledge of its network topology maintained by an SDN Controller, the system of the present invention is able to continually reoptimize the SDN Paths utilized by software applications running on the network in a non-disruptive manner.

The present invention has been described herein with reference to specific embodiments as illustrated in the accompanying drawings. It should be understood that, in light of the present disclosure, additional embodiments of the concepts disclosed herein may be envisioned and implemented within the scope of the present invention by those skilled in the art.

What is claimed is:

1. A method of controlling communications in a network, the method comprising:
    storing data transfer topology information indicating at least physical topology among data transfer devices;
    storing application metadata extracted from a plurality of application components, said application metadata including thread counts, number of concurrent users, and number of running instances;
    identifying network operation and performance problems based on analyzing the application metadata;
    generating a data transfer path to be used for communicating data corresponding to an application component based on the data transfer topology information, the identified network operation and performance problems and data transfer technology characteristics, said data transfer technology characteristics including information about which of the data transfer devices can interoperate, along with their data transfer device data rates, and latency;
    performing a simulation of the data transfer path using historical network traffic patterns to predict an effect of the generated data transfer path on traffic patterns;
    making a decision based on said simulation as to whether or not to implement the generated data transfer path instead of a current data transfer path, wherein the decision is made based on whether or not the generated data transfer path is more optimal than the current data transfer path;
    using the data transfer path to communicate data corresponding to the application component when said decision is to implement said generated data path; and
    wherein at least some of said data transfer devices correspond to different technologies used in a mixed technology network.

2. The method of claim 1, wherein said simulation is part of an iterative process wherein alternative potential paths are tested without affecting the network.

3. The method of claim 1, wherein the generated data transfer path is between application components, the method further comprising:
    performing a dynamic path optimization to optimize the performance of a set of software applications running on the mixed technology network.

4. The method of claim 1, further comprising:
    performing an application topology discovery operation to determine which application components are associated by virtue of a data transfer relationship.

5. The method of claim 4, further comprising re-computing a path corresponding to a data flow in response to a problem detected in the performance of a software application running on the network.

6. The method of claim 1, further comprising:
    implementing the data transfer path, said step of implementing the data transfer path including updating a forwarding rule in a node in the data transfer path.

7. The method of claim 6, wherein said data transfer path is part of a Software Defined Network (SDN) path.

8. The method of claim 6, wherein said forwarding rule for said node is based on an ingress port of the node, an egress port of the node, and a bit-mask.

9. The method of claim 1 wherein, said data transfer technology characteristics further including data transfer device setup time.

10. The method of claim 1 wherein said data transfer technology characteristics of claim 9 wherein said data transfer technology characteristics further include data transfer device reconfiguration speed and cost.

11. The method of claim 1 wherein said at least some of said data transfer devices in said mixed technology network include both optical circuit-switched network devices and IP-based packet-switched network devices.

12. The method of claim 11 wherein said optical circuit-switched network devices include Optical Cross-Connect switches in which switching is performed by electrical cross connect circuit switches connected to optical-to-electrical and electrical-to-optical converters.

13. The method of claim 1 wherein said stored application metadata further includes transaction rate, elapsed transaction times, and uptime or downtime metrics extracted from said plurality of application components.

14. The method of claim 1, further comprising:
    implementing the data transfer path, said step of implementing the data transfer path including a reconfiguration of logical traffic paths in the network without triggering a loss of connectivity.

15. The method of claim 1 further including:
    prior to generating said data transfer path to be used for communicating data corresponding to an application component based on the data transfer topology information, application metadata and data transfer technology characteristics:
    identifying said data transfer technology characteristics for said data transfer devices in the network; and
    storing in memory said data transfer technology characteristics for said data transfer devices.

16. The method of claim 1 wherein said performing a simulation of the data transfer path using historical network traffic patterns to predict an effect of the generated data transfer path on traffic patterns includes populating a temporary copy of the stored data transfer topology information.

17. The method of claim 1 further comprising:
    obtaining real-time network metrics from data transfer devices;
    normalizing said obtained network metrics; and
    wherein said generating said data transfer path to be used for communicating data corresponding to said application component is also based on said normalized network metrics from said data transfer devices, said network metrics being infrastructure layer metrics.

18. The method of claim 17 further including:
    obtaining additional application metadata from application log files of one or more application components and from deep packet inspectors; and wherein said generating said data transfer path to be used for communicating data corresponding to said application component is also based on said additional application metadata.

19. A system for controlling communications in a network, the system comprising:
   a data transfer topology database including data transfer topology information indicating at least physical topology among data transfer devices;
   an application information database storing application related information including application metadata extracted from a plurality of application components, said application metadata including thread counts, number of concurrent users, and number of running instances;
   a hardware implemented controller that:
   (i) identifies network operation and performance problems based on analyzing the application metadata;
   (ii) generates a data path to be used for communicating data corresponding to an application component based on the data transfer topology information, the identified network operation and performance problems and data transfer technology characteristics, said data transfer technology characteristics including information about which of the data transfer devices can interoperate, along with their data transfer device data rates, and latency;
   (iii) performs a simulation of the data transfer path using historical network traffic patterns to predict an effect of the generated data transfer path on traffic patterns;
   (iv) makes a decision based on said simulation as to whether or not to implement the generated data transfer path instead of a current data transfer path, wherein the decision is made based on whether or not the generated data transfer path is more optimal than the current data transfer path; and
   (v) uses the data transfer path to communicate data corresponding to the application component when said decision is to implement said generated data path; and wherein at least some of said data transfer devices correspond to different technologies used in a mixed technology network.

20. A non-transitory storage media including software modules which when run on one or more components of a system causes the system to:
   store data transfer topology information indicating at least physical topology among data transfer devices;
   store application metadata extracted from a plurality of application components, said application metadata including thread counts, number of concurrent users, and number of running instances;
   identify network operation and performance problems based on analyzing the application metadata;
   generate a data transfer path to be used for communicating data corresponding to an application component based on the data transfer topology information, the identified network operation and performance problems and data transfer technology characteristics, said data transfer technology characteristics including information about which of the data transfer devices can interoperate, along with their data transfer device data rates, and latency;
   perform a simulation of the data transfer path using historical network traffic patterns to predict an effect of the generated data transfer path on traffic patterns;
   make a decision based on said simulation as to whether or not to implement the generated data transfer path instead of a current data transfer path, wherein the decision is made based on whether or not the generated data transfer path is more optimal than the current data transfer path;
   use the data transfer path to communicate data corresponding to the application component when said decision is to implement said generated data path; and
   wherein at least some of said data transfer devices correspond to different technologies used in a mixed technology network.

* * * * *